United States Patent
Dang et al.

(10) Patent No.: US 12,367,250 B2
(45) Date of Patent: Jul. 22, 2025

(54) DETECTION AND REMOVAL OF PREDEFINED SENSITIVE INFORMATION TYPES FROM ELECTRONIC DOCUMENTS

(71) Applicant: Microsoft Technology Licensing, LLC, Redmond, WA (US)

(72) Inventors: Amy Hariharan Dang, Orland Park, IL (US); Sunil Shankar Kadam, Redmond, WA (US); Hassan Almandil, Bellevue, WA (US); Yibing Chen, Bellevue, WA (US); Mark-Gil Parayno, Seattle, WA (US); Meir Baruch Blachman, Jerusalem (IL); Tomer Cherni, Ganie (IL); Nitzan Frogel, Tel Aviv (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/326,947

(22) Filed: May 31, 2023

(65) Prior Publication Data
US 2024/0403374 A1    Dec. 5, 2024

(51) Int. Cl.
*G06F 16/9532* (2019.01)
*G06F 16/957* (2019.01)
*H04L 67/56* (2022.01)

(52) U.S. Cl.
CPC ........ *G06F 16/9532* (2019.01); *G06F 16/957* (2019.01); *H04L 67/56* (2022.05)

(58) Field of Classification Search
None
See application file for complete search history.

(56) References Cited

U.S. PATENT DOCUMENTS

| 7,536,635 | B2 | 5/2009 | Racovolis |
| 7,913,167 | B2 | 3/2011 | Cottrille et al. |

(Continued)

FOREIGN PATENT DOCUMENTS

EP    3991389 A1    5/2022

OTHER PUBLICATIONS

"<input type="hidden">", Retrieved From: https://developer.mozilla.org/en-US/docs/Web/HTML/Element/input/hidden, Mar. 13, 2023, 4 Pages.

(Continued)

*Primary Examiner* — Kannan Shanmugasundaram
(74) *Attorney, Agent, or Firm* — Barta Jones, PLLC

(57) ABSTRACT

Automated and semi-automated document redaction technology is disclosed herein. In certain example embodiments, 'context-aware' redaction is provided. Automated techniques are used to identify a set of potentially sensitive item(s) within a document. The potentially sensitive item(s) are filtered based on contextual information, such an entity identifier (e.g. person identifier, person group identifier identifying a group of multiple people, organization identifier etc.), resulting in a filtered set of redaction candidate(s). The filtered redaction candidate(s) may, for example, be redacted from the document automatically, or outputted as suggestions in an assisted redaction tool, e.g. via a document redaction graphical user interface. Other example embodiments consider selective redaction when uploading and/or downloading documents via a proxy server, to prevent intended or unintended release of potentially sensitive information, e.g. in a web browsing context.

19 Claims, 14 Drawing Sheets

(56) References Cited

U.S. PATENT DOCUMENTS

| | | | |
|---|---|---|---|
| 8,826,443 B1* | 9/2014 | Raman | G06F 21/6245 726/26 |
| 8,973,128 B2 | 3/2015 | Sokolan et al. | |
| 10,885,225 B2 | 1/2021 | Balzer et al. | |
| 10,929,561 B2 | 2/2021 | Long et al. | |
| 2011/0239113 A1* | 9/2011 | Hung | G16H 15/00 715/271 |
| 2019/0129968 A1* | 5/2019 | Neylan | G06F 16/168 |
| 2020/0186534 A1* | 6/2020 | Chanda | H04L 63/102 |

OTHER PUBLICATIONS

"Apache PDFBox®—A Java PDF Library", Retrieved From: https://pdfbox.apache.org/, Retrieved On: Nov. 8, 2022, 5 Pages.

"Brighter AI's Image & Video Anonymization Solution", Retrieved From: https://brighter.ai/product/, Retrieved On: Mar. 13, 2023, 14 Pages.

"How to Automate your DSAR Process with Discovery & Redaction", Retrieved From: https://www.onetrust.com/blog/how-to-automate-your-dsar-process-with-discovery-redaction/, Jul. 21, 2021, 7 Pages.

"Microsoft Priva Subject Rights Requests", Retrieved From: https://www.microsoft.com/en-us/security/business/privacy/microsoft-priva-subject-rights-requests, Retrieved On: Mar. 13, 2023, 7 Pages.

"OneTrust Acquires DocuVision's Redacted.ai to Expand Automated Data Redaction", Retrieved From: https://www.onetrust.com/news/onetrust-acquires-docuvisions-redacted-ai-to-expand-automated-data-redaction/, Mar. 1, 2021, 8 Pages.

"OneTrust Privacy Rights (DSAR) Automation", Retrieved From: https://query.prod.cms.rt.microsoft.com/cms/api/am/binary/RE4R7cb, Retrieved On: Mar. 13, 2023, 2 Pages.

"Super Redact", Retrieved From: https://super.ai/redact, Retrieved On: Mar. 13, 2023, 8 Pages.

"Take Control of Critical Data to Eliminate Business Risk", Retrieved From: https://www.datagrail.io/, Retrieved On: Mar. 13, 2023, 5 Pages.

"TrustWeek news: OneTrust launches enhanced and automated Data Redaction capabilities", Retrieved From: https://www.onetrust.com/blog/onetrust-launches-enhanced-and-automated-data-redaction-capabilities/, Oct. 13, 2020, 8 Pages.

"Application as Filed in U.S. Appl. No. 17/841,396", Mailed Date: Jun. 15, 2022, 41 Pages.

Dilmegani, Cem, "Guide to Automated Redaction & Its Benefits in 2023", Retrieved From: https://research.aimultiple.com/automated-redaction/, Dec. 10, 2022, 9 Pages.

Foster, Kelsey, "What are the Top PII Redaction APIs and AI Models for 2023?", Retrieved From: https://www.assemblyai.com/blog/what-are-the-top-pii-redaction-apis-and-ai-models/, Aug. 30, 2022, 17 Pages.

Mazzoli, "Sensitive Information Type Entity Definitions", Retrieved From: https://learn.microsoft.com/en-us/microsoft-365/compliance/sensitive-information-type-entity-definitions?view=o365-worldwide, Feb. 17, 2023, 9 Pages.

Moore, Amber, "DataGrail Launches API & Agent to Automate DSR Fulfillment Across All Internal Data Systems, Saving Companies Weeks of Engineering Time", Retrieved From: https://www.businesswire.com/news/home/20220604005040/en/DataGrail-Launches-API-Agent-to-Automate-DSR-Fulfillment-Across-All-Internal-Data-Systems-Saving-Companies-Weeks-of-Engineering-Time, Jun. 10, 2022, 5 Pages.

Rayani, Alym, "Simplify Privacy Protection with Microsoft Priva Subject Rights Requests", Retrieved From: https://www.microsoft.com/en-us/security/blog/2022/11/10/simplify-privacy-protection-with-microsoft-priva-subject-rights-requests/#:~:text=Priva%20helps%20organizations%20more%20efficiently%20manage%20requests%20at,redaction%2C%20and%20collaboration%2C%20all%20from%20an%20easy-to-use%20dashboard., Nov. 10, 2022, 6 Pages.

Sawers, Paul, "OneTrust acquires DocuVision to automatically find and redact sensitive data in documents", Retrieved From: https://venturebeat.com/business/onetrust-acquires-docuvision-to-automatically-find-and-redact-sensitive-data-in-documents/, Mar. 1, 2021, 6 Pages.

Vandenberg, Steve, "Manage subject rights requests at scale with Microsoft Priva", Retrieved From: https://www.microsoft.com/en-us/security/blog/2022/03/16/manage-subject-rights-requests-at-scale-with-microsoft-priva/, Mar. 16, 2022, 12 Pages.

Vukos-Walker, et al., "Data Matching for Subject Rights Requests", Retrieved From: https://learn.microsoft.com/en-us/privacy/priva/subject-rights-requests-data-match, Feb. 22, 2023, 5 Pages.

Vukos-Walker, et al., "Integrate and Extend Through Microsoft Graph API and Power Automate", Retrieved From: https://learn.microsoft.com/en-us/privacy/priva/subject-rights-requests-automate, Feb. 22, 2023, 3 Pages.

Vukos-Walker, et al., "Learn About Microsoft Priva", Retrieved From: https://learn.microsoft.com/en-us/privacy/priva/priva-overview, Apr. 4, 2023, 6 Pages.

Vukos-Walker, et al., "Learn about Priva Subject Rights Requests", Retrieved From: https://learn.microsoft.com/en-us/privacy/priva/subject-rights-requests, Feb. 22, 2023, 2 Pages.

"Bleep Private Beta", Retrieved From: https://game.info.intel.com/bleepbeta-download, Retrieved On: Jun. 1, 2023, 2 Pages.

"Bleep Release Notes", Retrieved From: https://game.info.intel.com/bleepbeta-release-notes, Retrieved On: Jun. 1, 2023, 3 Pages.

"Bleep User Guide", Retrieved From: https://game.info.intel.com/bleepbeta-user-guide, Retrieved On: Jun. 1, 2023, 4 Pages.

"Data Loss Protection", Retrieved From: https://thetalake.com/resource-download-solution-overview-data-loss-protection-for-your-collaboration-platforms/, Retrieved On: Jun. 1, 2023, 4 Pages.

"How to Redact a File", Retrieved From: https://help.accusoft.com/PCC/v8.1/HTML/How%20To%20Redact%20a%20File.html, Retrieved On: Jun. 1, 2023, 1 Page.

"Veritone Blog", Retrieved From: https://www.veritone.com/blog/how-i-built-an-image-proxy-server-to-anonymise-images-in-twenty-minutes/, Jan. 16, 2018, 9 Pages.

Porter, John, "Today I Learned About Intel's AI Sliders That Filter Online Gaming Abuse", Retrieved From: https://www.theverge.com/2021/4/8/22373290/intel-bleep-ai-powered-abuse-toxicity-gaming-filters, Apr. 8, 2021, 9 Pages.

Vautier, Nicolas, "Build an SMS Proxy that Redacts PII from Conversation Threads Using Twilio SMS, Pangea Redact Service, and Python", Retrieved From: https://www.twilio.com/blog/build-sms-proxy-redact-pii-from-sms-conversations-pangea-redact-service-python, Dec. 6, 2022, 12 Pages.

Campbell, Oliver-James, "Tech Companies Want to Tackle Harassment in Gaming", Retrieved From: https://www.wired.com/story/tech-companies-harassment-gaming-riot-intel-microsoft/, Jun. 20, 2021, 18 Pages.

"Your top 10 data redaction questions answered", Retrieved From: https://www.onetrust.com/blog/data-redaction-faq/, Mar. 30, 2021, 10 Pages.

* cited by examiner

DETECTION AND REMOVAL OF PREDEFINED SENSITIVE INFORMATION TYPES FROM ELECTRONIC DOCUMENTS

TECHNICAL FIELD

The present disclosure pertains to systems, methods and computer programs for detecting and removing predetermined types of sensitive information from electronic documents.

BACKGROUND

The need to remove certain types of sensitive information from electronic documents arises in various contexts. For example, the release of certain type(s) of information (such as user credentials, bank details etc.) may present a security risk. As another example, a privacy restriction may necessitate removal of certain type(s) of identity data from a document before the document is released.

SUMMARY

Automated and semi-automated document redaction technology is disclosed herein. In certain example embodiments, 'context-aware' redaction is provided. Automated techniques are used to identify a set of potentially sensitive item(s) within a document. The potentially sensitive item(s) are filtered based on contextual information, such an entity identifier (e.g. person identifier, person group identifier identifying a group of multiple people, organization identifier etc.), resulting in a filtered set of redaction candidate(s). The filtered redaction candidate(s) may, for example, be redacted from the document automatically, or outputted as suggestions in an assisted redaction tool, e.g. via a document redaction graphical user interface. Other example embodiments consider selective redaction when uploading and/or downloading documents via a proxy server, to prevent intended or unintended release of potentially sensitive information, e.g. in a web browsing context. In some cases, context-aware redaction may be implemented in this context.

BRIEF DESCRIPTION OF FIGURES

Illustrative embodiments will now be described, by way of example only, with reference to the following figures, in which.

DETAILED DESCRIPTION

Figure 1:
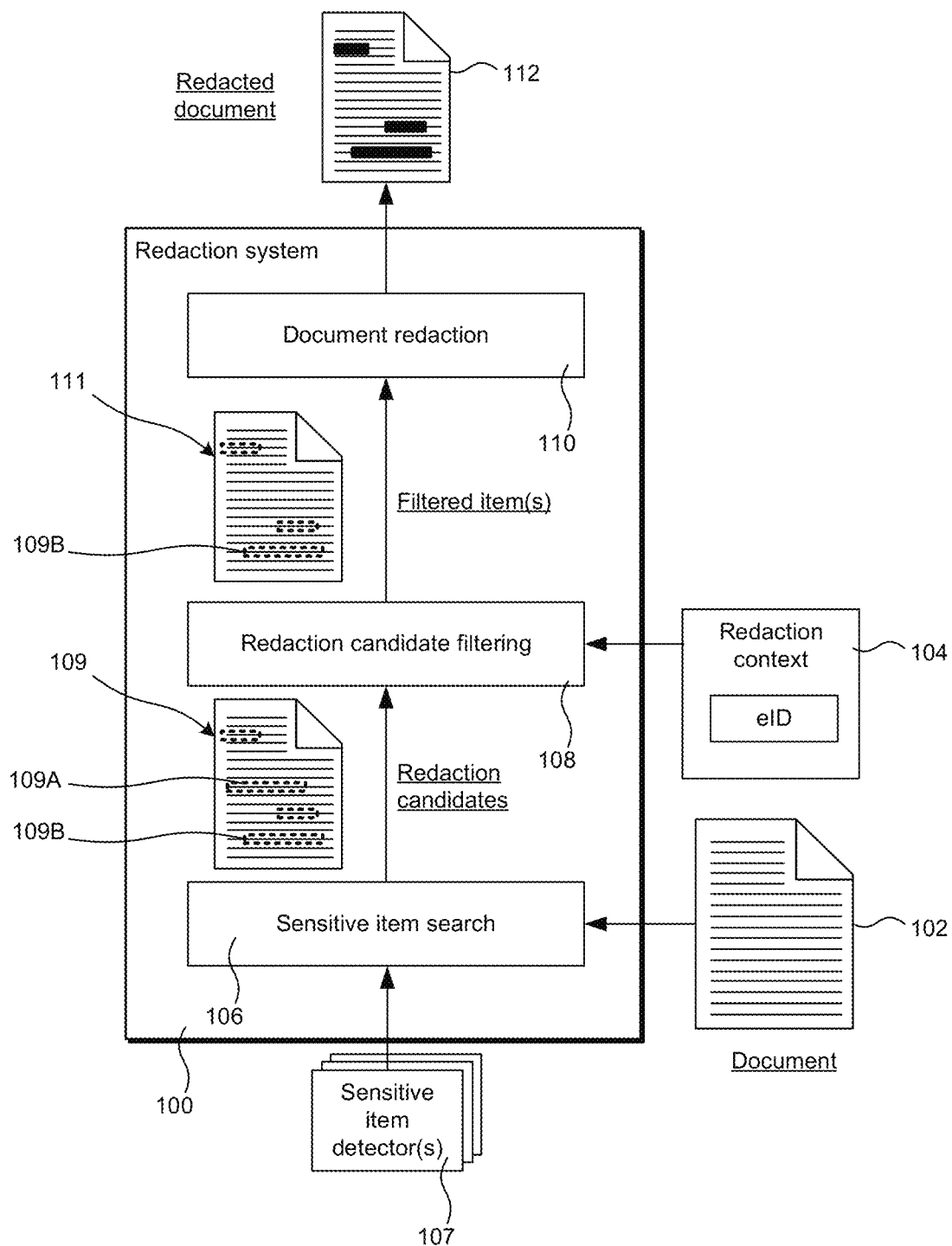
FIG. 1 shows a schematic block a diagram of a document redaction system.

Improvements in data security are achieved herein through automated or semi-automated document redaction.

Many existing document redaction tools merely facilitate manual redaction of electronic documents. A user must manually identify (e.g. highlight) item(s) to be redacted within a document. Certain existing tools are capable of automatically recognizing certain types of potentially sensitive information in documents, typically using some form of pattern recognition. However, such tools lack context awareness. In certain example embodiments of the present disclosure, potentially sensitive items are automatically identified within a document, but then filtered based on contextual information, such as an entity (e.g., person or group etc.) identifier. One use case is automatically redacting personal information from a document, or automatically identifying and outputting candidate redaction items that potentially contain personal information, but with the exception of personal information relating to an identified person or group of people. For example, a person identifier (or person group identifier) may be associated with a document request, or with an uploaded or downloaded document, and any identified personal item(s) determined to match that person identifier may be filtered out from a set of potentially sensitive items that has been identified. Hence, in some cases, a first item and a second item may be identified within the electronic document as belonging to a predefined sensitive information category (e.g. a personal information category generally relating to personal information, or relating to a specific type or types of personal information). However, the first item may be determined to match an entity identifier that provides context to the redaction process, triggering an exception, e.g. preventing redaction of the first item from the document, or preventing the first item from being indicated as a redaction candidate. This context-awareness reduces the likelihood of inappropriate document redaction, which ultimately makes the process more efficient. If a document is redacted incorrectly, it is generally not possible to retrieve the redacted information from the document (that is the purpose of redaction), meaning the process would have to be repeated from scratch in that event. In an assisted redaction tool, it may be possible to correct a set of redaction candidates manually before the document is actually redacted. However, that will require additional manual effort, and also have a consequent cost in computing resources required to correct errors in the identification of redaction candidates. Improved redaction (whether automated or semi-automated) ultimately increases the speed and efficiency with which a computer system implementing the redaction method is able to achieve a desired redaction outcome.

Context-aware redaction may involve detecting within an electronic document first and second items belonging to a predefined sensitive information category. Once detected, the first item may be matched with a contextual entity identifier, with the consequence that the first item is filtered out (meaning it is not redacted or outputted as a redaction candidate). In this manner, a lightweight context-aware filtering 'layer' is applied on top of sensitive information detection logic. This does not require any context awareness within the sensitive information detection logic, which simplifies its implementation (for example, a context-aware filtering layer can be applied on top existing sensitive information detection logic, without modification to the latter). The context-aware filtering layer can be implemented efficiently with relatively simple filtering logic (compared with the sensitive information detection logic, which is potentially far richer, and may use more complex processing), using minimal computational resources on a computer device implementing the filtering. This, in turn avoids the high cost (in time and computing resources) that would be needed to build a context-aware sensitive information detector. Decoupling the sensitive information detection and context-aware filtering in this manner also provides greater scalability, as the sensitive information detection logic can be more readily refined (e.g. through retraining where machine learning techniques are used) and/or extended to new types of sensitive information or new sensitive information categories etc., which may not require any modification to the context-aware filtering layer, or only straightforward modification (e.g. to incorporate a type of new entity identifier).

When implemented in an assisted (semi-automated) redaction tool, the refinement of redaction candidates that are presented via a graphical user interface (GUI) provides an improved human-machine interaction, as less manual effort is required to manually finalize and redact the redaction candidates. Such embodiment provide an improved document redaction GUI compared with existing redaction tools, which either require a user to manually identify redaction candidates, or manually remove contextually inappropriate redaction candidates in the case of redaction tools that can automatically identify redaction candidates but lack context awareness.

Certain embodiments implement selective redaction of documents that are uploaded and/or downloaded via a proxy server. In some deployment scenarios, a proxy server sits 'invisibly' between a client device and an upstream server. Existing proxy architectures tend to be based on an 'all or nothing' approach, whereby downloads or uploads are either permitted or blocked in accordance with a download/upload policy. However, in the present context, selective redaction of documents passing though the proxy server provides more fine-grained control, e.g. an upload or download action may be permitted, but an uploaded or downloaded document may be selectively redacted (e.g. by 'blacking out' certain part(s) of the document) to prevent sharing of unauthorized information. This approach provides improved data security, but with greater flexibility in comparison to conventional proxy-based methods. Existing proxy services can provide improved data security (e.g. by blocking upload/downloads in relation to certain websites etc.), but can be overly burdensome for end users, particularly if uploads/downloads are blocked unnecessarily. The present techniques can achieve a given level of data security in respect of sensitive information, but in a way that is less detrimental to the overall end-user experience.

FIG. 1 shows a schematic block diagram of a redaction system 100. The redaction system 100 is shown to comprise a document search component 106, a sensitive item detector 107, a filtering component 108 and a redaction component 110. The components 106, 107, 108, 110 are function components, which may, for example, be implemented in the form of code executed on a processor (or processors) of the redaction system 100 (not shown). Such code may be stored in a memory (or memories) coupled to the processor(s), and be configured to cause the processor(s) to implement the described functions when executed thereon.

The redaction system 100 applies a context-aware redaction process to an electronic document 102 in the manner described below.

The document search component 106 is configured receive the electronic document 102 and search the electronic document 102 for any 'sensitive items' it might contain. A sensitive item refers to a document portion determined to belong to a predefined sensitive information category, such as a personal information category. Sensitive information might, for example, include user biometrics, user credentials, names, dates of birth, addresses, telephone numbers, identity numbers (e.g. passport, identity car, social security etc.), bank account details, private company information etc. Such information types may be sensitive because, e.g., they pose a security risk in the hands of a malicious user, because of user privacy concerns, or due to confidentiality concerns. A sensitive information category can be relatively broad (e.g. 'person identifiers' might be a single category, encompassing a wide variant of sensitive information types) or specific (e.g. with separate categories for different forms of personal identifiers). An 'entity' in this context may refer to a person, but can also refer to other types of entity, such as organizations (e.g. companies), devices etc.

The sensitive item detector 107 is associated with a predefined sensitive information category. The document search component 106 uses the sensitive item detector 107 to identify any sensitive (or potentially sensitive) items within the electronic document 102 that belong to its associated sensitive information category. The sensitive item detector 107 may, for example, be a machine learning (ML) component that has been trained on examples of sensitive items within this predefined sensitive information category. In this case, the sensitive information category may be defined implicitly in the choice of examples used to train the sensitive item detector 107. Alternatively, the sensitive item detector 107 may be a ruled-based component, in which case the sensitive information category may be defined explicitly in rules coded in the sensitive item detector 107. Alternatively, a combination of ML and rules-based sensitive item detection may be used. Pattern detection (ML and/or rules-based) may be used to detect such items within the electronic document 102. In some embodiments, multiple sensitive item detectors may be provided, which are associated with different sensitive information categories (e.g. different types of personal information).

The document search component 106 outputs a redaction candidate set 109. The redaction candidate set 109 contains or references any sensitive item(s) that the document search component 106 has located within the electronic document 102. Such items are referred to as 'redaction candidates' because they are not redacted from the electronic document 102 at this stage. Rather, the filtering component 108 applies context-aware filtering to the redaction candidate set 109 to selectively remove item(s) from the redaction candidate set 109 before the electronic document 102 is redacted.

The filtering component 108 receives the redaction candidate set 109, and additionally receives redaction context 104 relating to the electronic document 102.

In this example, the redaction context 104 is shown to comprise an entity identifier (eID) associated with the electronic document 102. The eID provides relevant context to the redaction process. For example, the eID might be a person identifier associated with the electronic document 102, or with a request for an electronic document that may need to be redacted before it is released. The following examples consider an eID that belongs to the sensitive information category associated with the sensitive item detector 107. Therefore, if the eID (or a detectable variant of the eID) appears somewhere in the contents of the electronic document 102, it may be detected by the sensitive item detector 107 when applied to the electronic document 102. As such, the redaction candidate set 109 may include a sensitive item that contains the eID or some variant of the eID.

However, in certain contexts, it may be inappropriate or undesirable to redact the eID from the electronic document 102. For example, the eID might be an identifier of a person who has submitted a request for copies of any documents held within a document storage system that contains their personal information. In this case, it would not be appropriate to redact instance(s) of the eID from the electronic document 102. However, in certain contexts, it may be necessary or desirable to redact any other person's (or other entity's) identifiable information (referred to as 'third-party' information).

The filtering component 108 searches the redaction candidate set 109 for any items matching the eID, and removes any item that is determined to match the eID from the redaction candidate set 109. Such items may be identified via hard (exact) matching or soft matching, or via a combination of hard and soft matching. In some cases, multiple eIDs may be received (such as a person's name and telephone number) and used to filter the redaction candidate set 109. For example, and eID may be received (e.g. a name or username), and used to locate one or more further eIDs associated with the received eID (e.g. phone number, email address, date of birth etc. associated with the name or username). Such further eID(s) may, for example, be located in a database(s) of user information. With multiple eIDs, the following description applies to each ID forming part of the redaction context 104. An eID associated with a message may, therefore, be contained in the message, or not contained in the message but associated with another identifier that is contained in the message (for example).

In the depicted example, the document search component 106 identifies a first item 109A and a second item 109B, each of which is determined to belong to the sensitive information category associated with the item detector 107. Therefore, the first and second items 109A and 109B are included in the redaction candidate set 109.

The first item 109A does contain the eID of the redaction context 104 (or some variant thereof). The filtering component 108 matches the eID with redaction candidate set 109 includes the first item 109A, and removes the first item 109A from the redaction candidate set 109 in response.

The second item 109B relates to a different entity, meaning the filtering component does not match with the second item 109B with the eID of the redaction context 104.

The filtering component output 108 a filtered item set 111, which contains or references any items of the redaction candidate set 109 that have not been removed. In this example, the redaction candidate set 109 is shown to comprise the second item 109B, but not the first item 109A that was matched with the eID of the redaction context 104.

The redaction component 110 received the filtered item set 111 and uses the filtered item set 111 to generate a redacted document 112, which is a redacted version of the electronic document 102. The redated document 112 is generated by removing at least one sensitive item from the electronic document 102, or modifying the item so that it is no longer sensitive. For example, the item or some part (or parts) of the item may be removed, and optionally replaced with other context, such as an image (e.g. a black box) or placeholder text (e.g. a predetermined character(s) or string(s), or randomly generated text). Note, any redacted item is not simply visually obscured, but is actually removed or modified such that the original item is no longer derivable from the redacted document 112.

In some embodiments, the context-aware redaction process is entirely automatic. In this case, the redaction component 110 automatically redacts every item of the filtered item set 111 from the electronic document 102. In other embodiments, the option of a manual check is provided (referred to herein as 'assisted' redaction). In this case, the filtered item set 111 may be further prior to final redaction via user input to the redaction system 100, and the final redaction is also instigated via user input. For example, the filtered item set 111 may be visually indicated on a graphical user interface (GUI) associated with the redaction system 100 (not shown), and the filtered item set 111 may be modifiable via input to the GUI.

A copy of the original (unredacted) document 102 is retained, allowing (among other things) different redacted versions of the document to be generated in the future, based on different redaction context.

Figure 2:
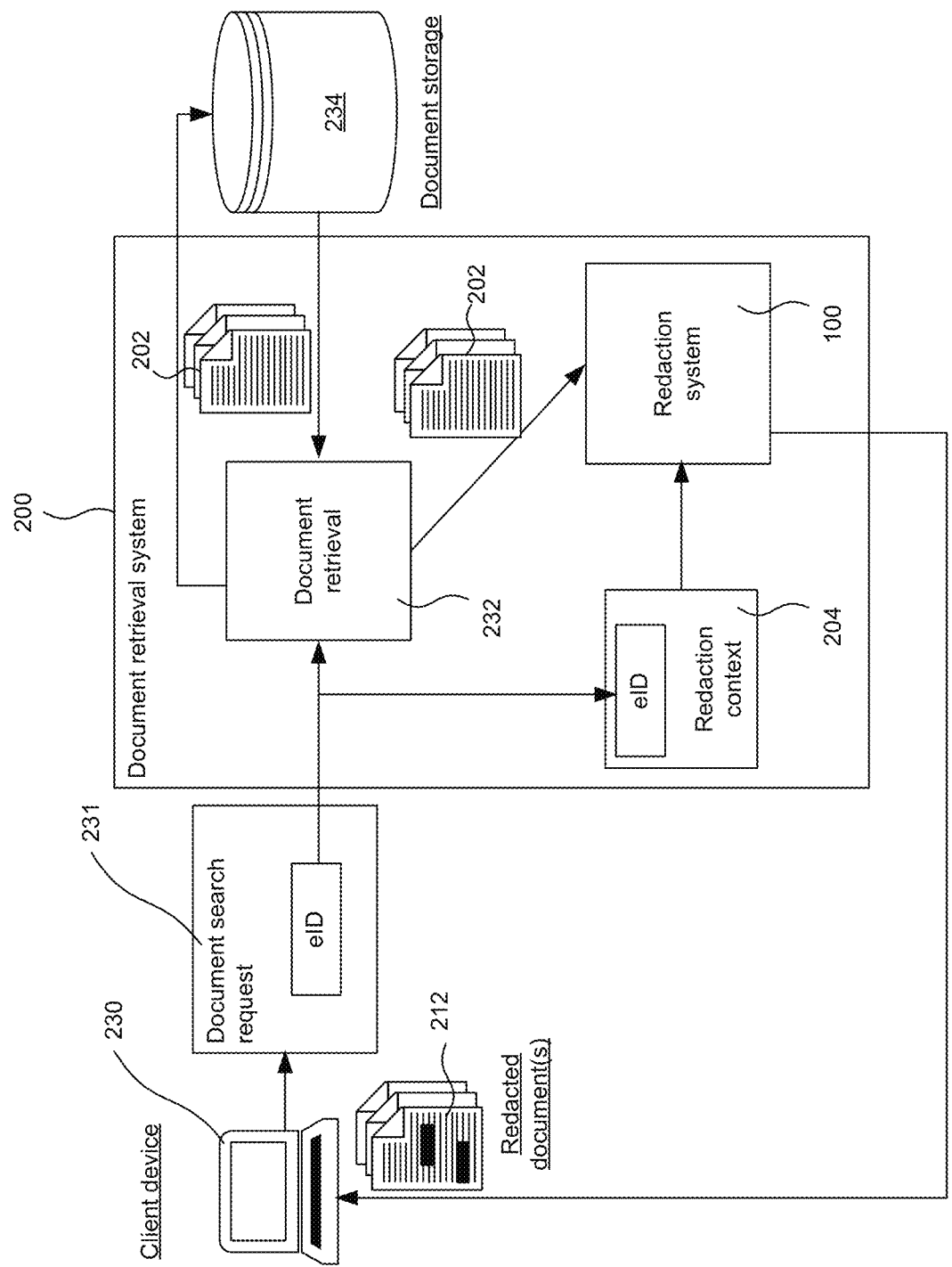
FIG. 2 shows a schematic block diagram of a document retrieval system incorporating a document redaction system.

FIG. 2 shows an example document retrieval system 200 that incorporates the redaction system 100 of FIG. 1. A document retrieval component 232 of the document retrieval system 200 receives from a client device 230 a document search request 231 comprising or otherwise indicating an entity identifier (eID), e.g., identifying a person, device or organization.

In the context of FIG. 2, redaction context 204 inputted to the redaction system 100 is derived from the document search request 231, and is shown to comprise the eID.

The document retrieval component 232 conducts a search of document storage 234 (e.g. database or databases) to retrieve therefrom any documents within target system found to satisfy the document search request 231. For example, the document retrieval component 232 may search for any document containing the eID or some recognized variant of the eID. For example, with a person ID identifying a person, the document retrieval component 232 may search for documents containing any personal information about the identified person. One or more other criteria may be applied, e.g. to restrict the scope of the search or to exclude certain types of document. As noted, the search may alternatively or additionally be based on an eID(s) that is not contained in the document search request 231, but is otherwise indicated by it (for example, an eID stored elsewhere in association with some other eID contained in the message).

Assuming the document retrieval component 232 finds at least one document 202 satisfying the document search request 231, in one implementation, the retrieved document 202 is passed automatically to the redaction system 100, along with the redaction context 204 comprising the eID. In another implementation, this step is subject to a manual review of any retrieved documents, e.g. to identify irrelevant documents or apparent gaps in the search before the document 202 is passed to the redaction system 100 along with the redaction context 204. If multiple documents are identified (and, where appliable, approved for release in the manual check), each document is passed to the redaction system 100, for processing sequentially or in parallel.

On receiving the documents 202, the redaction system 100 uses the redaction context 204 to identify and filter redaction candidates. Note, the eID is included in the redaction context 204 in this example. Thus, in this example, the eID is used both to locate the document 202, and to provide context to its redaction. Once use case is a person's request for documents containing their own personal information. The requesting person is identified by a person identifier contained or otherwise indicated in the document search request 231. An aim in this situation might be to release any such requested documents (e.g. to the extent defined by one or more document release criteria, e.g. based on legal requirements concerning personal data), and to retain the requesting user's personal information in such documents, but to redact any other person's personal data that is identified, e.g., in the same personal information category (and/or other type(s) of sensitive information, e.g. confidential information, that might be identified).

In one implementation, redaction candidates are identified, filtered and any redaction candidate(s) that remain after filtering are automatically redacted. In another implementation, the redaction system 100 outputs or indicates any redaction candidate(s) that remain after filtering via a user interface. In that case, the redaction system 100 may receive user input and modify the filtered set of redaction candidates (e.g. to add, remove and/or modify one or more redaction candidates) before final redaction. Either way, the result is as least one redacted document 212, which is communicated to the client device 230 (e.g. with a message or messages containing the redacted document 212, or indicating, e.g. by way of a link, a storage location at which the redacted document 212 is stored and from which it can be retrieved by the client device 230).

Another deployment scenario is considered below, which involves a client device operating 'behind' a proxy server. The proxy server implements a proxy service, e.g. a web proxy service through which web content is proxied (the term web proxy server may be used in this context). For example, incoming/outgoing network traffic to/from the client device may be routed via the proxy server, and the proxy server may selectively filter or block traffic in either direct in accordance with a policy (or set of multiple policies). Examples are described below, which consider a document redaction policy applied to downloaded and/or uploaded documents.

Figure 3:
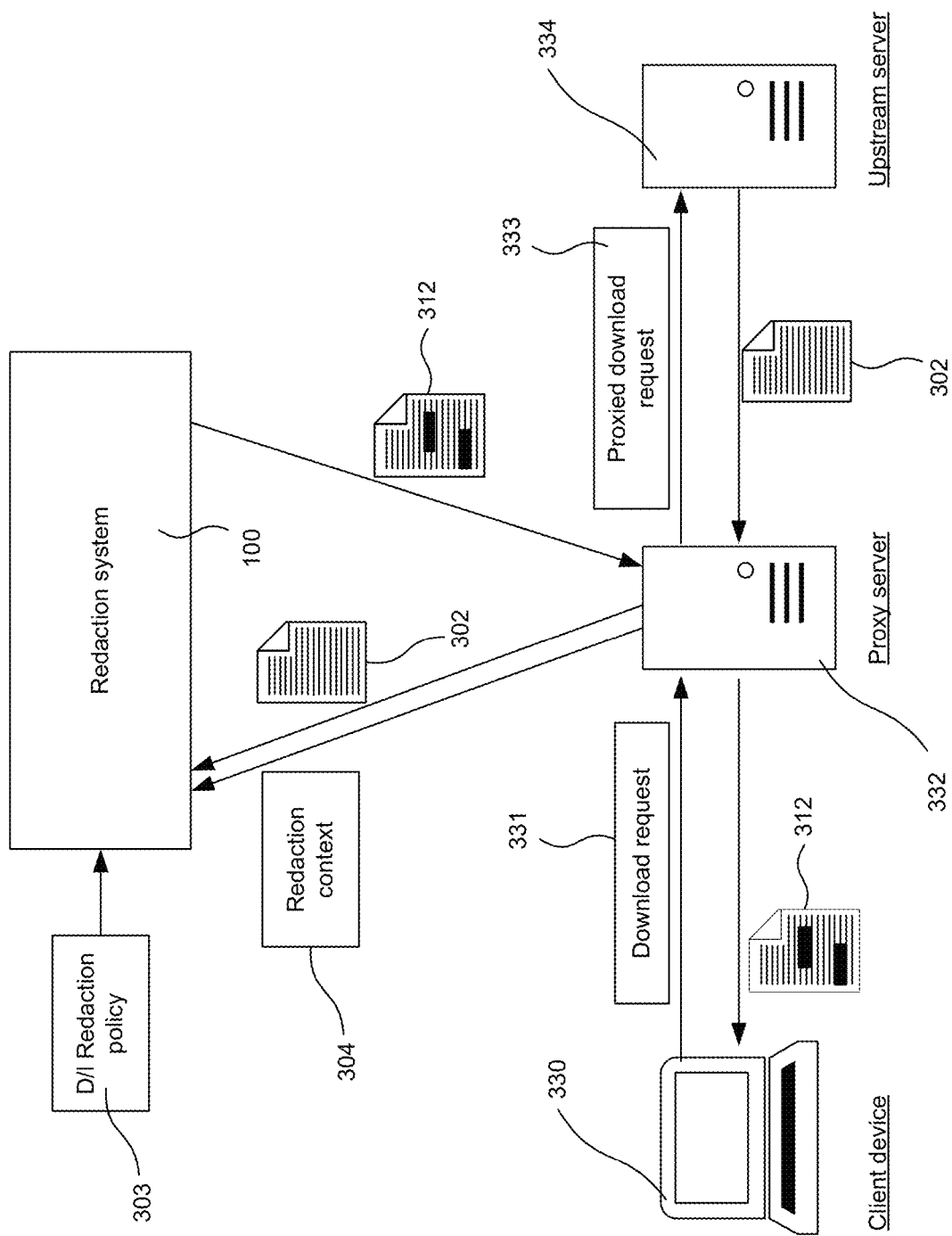
FIG. 3 shows a schematic block diagram of a proxy-based download redaction architecture.

FIG. 3 shows a schematic block diagram of a proxy download scenario with context-aware redaction using the redaction system 100. A client device 330 transmits a download request 331, which contains a destination address corresponding to an upstream server 334. The download request 331 is intercepted by a proxy server 332, and in response to the download request 331, the proxy server 332 sends a proxied download request 333 to the upstream server 334. The proxied download request 333 contains a modified source address corresponding to the proxy server 332. For example, the download request 331 may comprise a source address corresponding to the client device (e.g. an IP address or other network address of the client device 330 in a source field or fields of the download request 331), which is replaced with an IP address (or other network address) of the proxy server 332 in the proxied download request 333. The modified source address causes the upstream server 334 to send a response to the proxy server 332 rather than the client device 330.

The response comprises a document 302, on which selective redaction is instigated by the proxy server 332 based on a download redaction policy 303. In this case, the redaction system 100 may be implemented as part of the proxy server 332, or as a separate (e.g. external) service accessible to the proxy server 332. The proxy server 332 derives redaction context 304 from the download request 331, e.g. to extract from the download request 331 (or otherwise obtain based on the download request 331) an eID, which is associated with the document 302. For example, the eID may identify an entity that has instigated download of the document 302. For example, the eID may be a user identifier or device identifier contained in or otherwise indicated by the download request 331 and/or associated with the client device 33 (e.g. at the client device itself, or in a back-end system where user/device details are held).

The proxy server 332 passes the document 302 to the redaction system 100 along with the redaction context 304. The redaction system 100 uses the redaction context 304 to selectively redact the document 302, resulting in a redacted document 312. For example, the redaction system 100 may be configured to redact personal information from the document, with the exception of personal information that is associated with a person identifier in the redaction context 304 (which may, for example, identify a user of the client device 330; meaning that user's information is not redacted, but other personal information is redacted).

Note that, in the case the eID identified the entity that has instigated the download, the redaction of the document 302 is tailored to the entity attempting to download the document 302.

The proxy server 332 sends the redacted document 312 to the client device 330 in response to the download request 331, in place of the (unredacted) document 302 received from the upstream server 334, in a response to the original download request 331.

Figure 4:
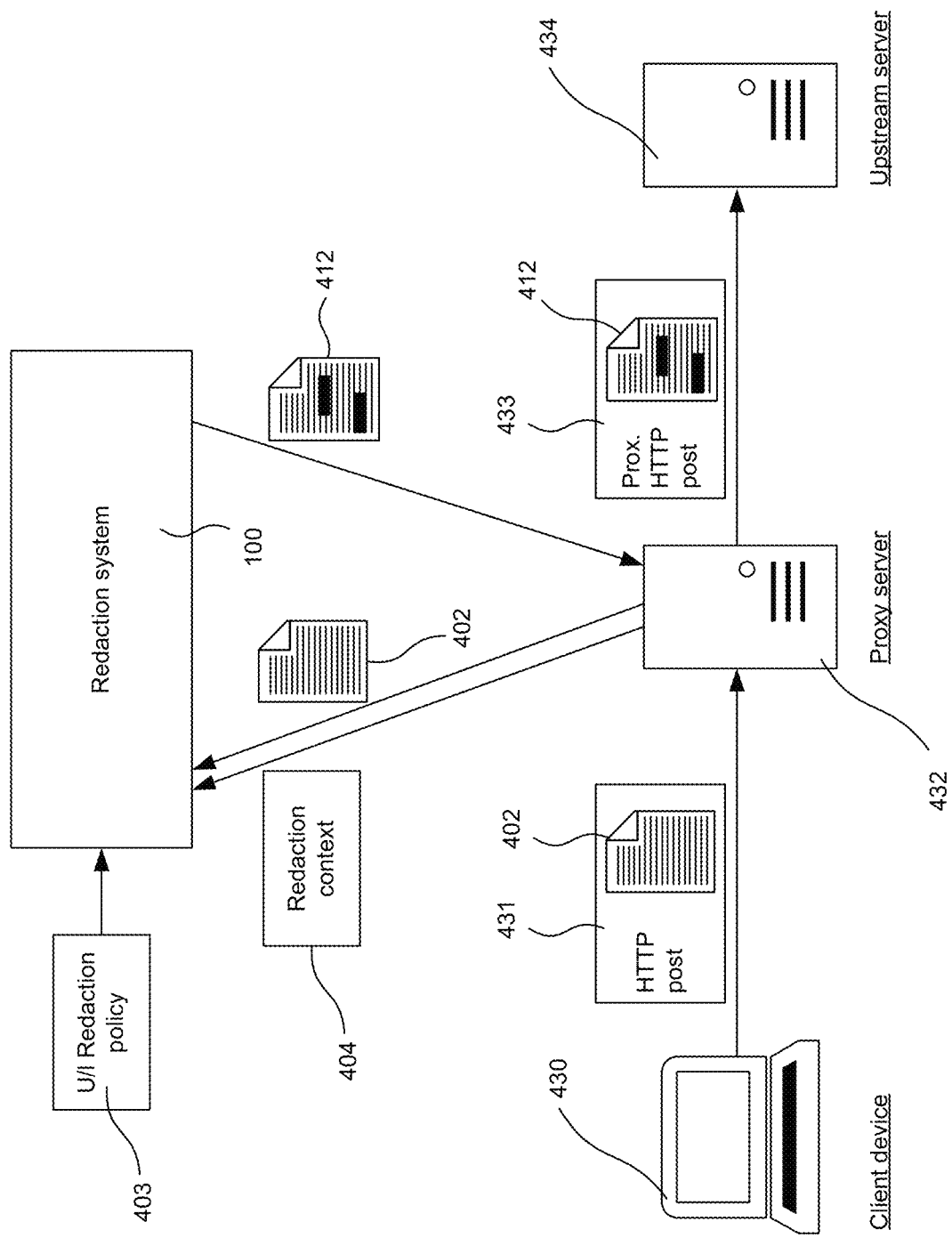
FIG. 4 shows a schematic block diagram of a proxy-based upload redaction architecture.

FIG. 4 shows a schematic block diagram of a proxy upload scenario with context-aware redaction using the redaction system 100. In this case, an upload request 431 is received from a client device 430 by a proxy server 432. The upload request 431 comprises a document 402 to be uploaded to an upstream server 434. For example, the upload request 431 may be an HTTP POST request comprising the document 402 to be uploaded. The proxy server derives redaction context 404 from the upload request 431, e.g. to extract from the upload request 431 (or otherwise obtain based on the upload request 431) and eID, which is associated with the document 402. For example, the eID may identify an entity that has instigated upload of the document 402. For example, the eID may be a user or device identifier contained in or otherwise indicated by the upload request 431 and/or associated with the client device 330 (e.g. at the client device itself, or in a back-end system where user/device details are held).

The proxy server 432 passes the document 402 from the upload request 431 to the redaction system 100, along with the redaction context 404 derived from the upload request 431. The redaction system 100 may be implemented locally at the proxy server 432, or as a separate (e.g. external) service accessible to the proxy server 432. The redaction system 100 uses the redaction context 404 to selectively redact the document 402 based on an upload redaction policy 403, resulting in a redacted document 412. The proxy server 432 sends to an upstream server 434 a proxied upload request 433 comprising or otherwise indicating the redacted document 412, meaning that the redacted document 412 is uploaded to the upstream server 434 in place of the (unredacted) document 402. The upstream server 434 may, for example, store the redacted document 412 in a network (e.g. cloud) storage location.

This approach can, for example, be used to permit a given user to share their own personal information via document upload (to the extent permitted by the upload redaction policy 403), but prevent them from intentionally or inadvertently sharing personal information about other people and/or other types of sensitive information (e.g. confidential information).

Note that, in the case the eID identified the entity that has instigated the upload, the redaction of the document 402 is tailored to the entity attempting to upload the document 402.

In some implementations, a proxy client executed on the client device 430 detects an upload event, and signals the upload event to the proxy server 432, causing the proxy server 432 to apply selective redaction to the document 402.

Figure 5:
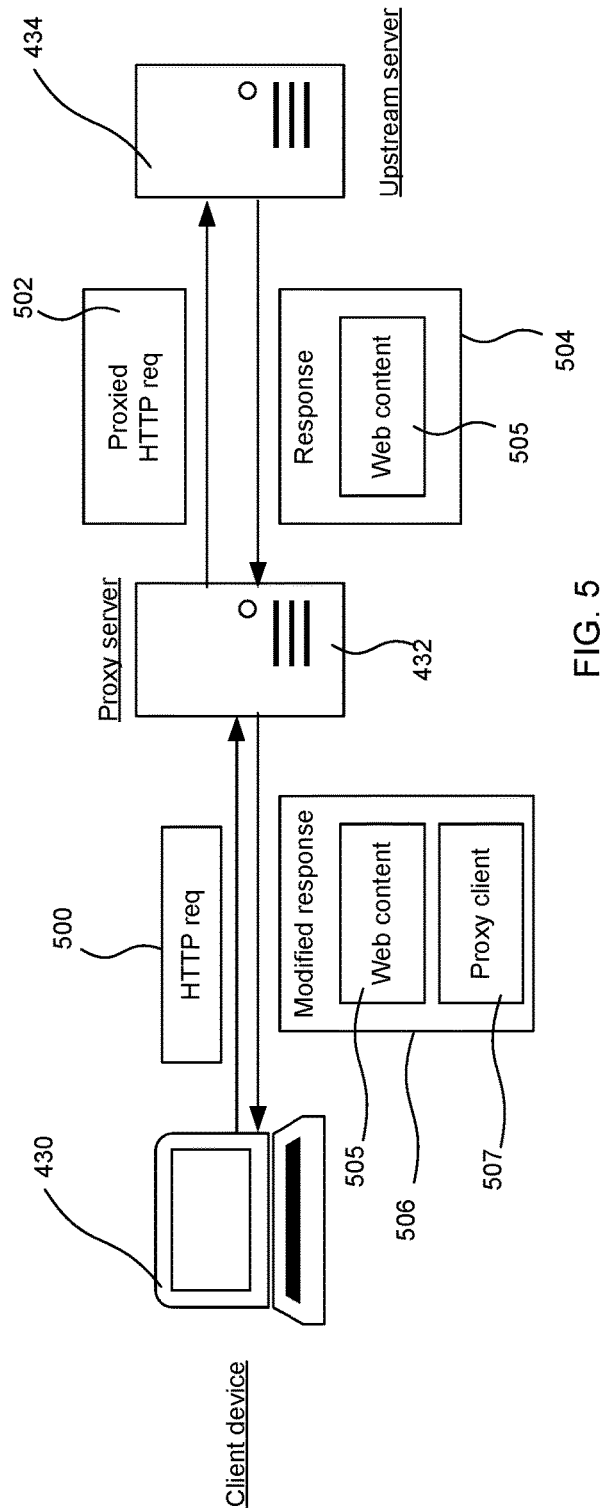
FIG. 5 shows a schematic block diagram of a web content request-response exchange between a client device and a proxy server.

FIG. 5 provides a schematic overview of a proxy client injection scenario. The client device 430 of FIG. 4 sends a content request 500 (such as an HTTP request), intended for the upstream server 434, e.g. requesting web content indicated in the content request 500. The content request comprises a resource identifier, e.g. a Uniform Resource Locator (URL) or Uniform Resource Identifier (URI), that identifies request web content 505. The proxy server 432 intercepts this content request 500, and replaces the request 500 with a proxied content request 502 (e.g. replacing a first source address of the client device 430 with a second source address of the proxy server 432). In response to the proxied content request 502, the upstream server 434 returns, to the proxy server 432, a response 504 comprising the requested web content 505. The proxy server 432 receives the response 504, and injects a proxy client 507 in the response 504, resulting in a modified response 506 comprising modified web content, which in turn comprises the requested web content 505 and the proxy client 507. The proxy server 432 sends the modified response 506 to the client device 430 in response to content request 500. The proxy client 507 has the form of executable proxy client code (such as JavaScript code) suitable for execution on the client device 430. In rendering the requested web content 505, the proxy client 507 is executed on the client device 430. The requested web content 505 may, for example, comprise a webpage with an upload field or other document upload function that is used to send the upload request 431 of FIG. 4.

Figure 6:
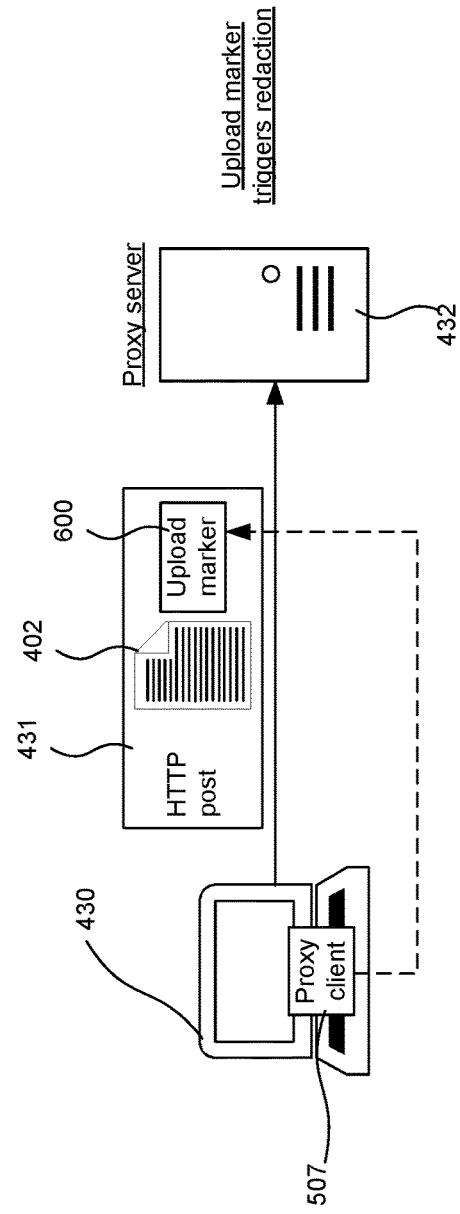
FIG. 6 shows a schematic block diagram of a proxy-based upload redaction architecture incorporating a proxy client.

FIG. 6 shows the proxy client 507 running on the client device 430. In this example, the proxy client 507 inserts, in the upload request 431 of FIG. 4, an upload marker 600, in the form of marker data included along with the uploaded document 402. The proxy client 507 is configured to detect instigation of the document upload function in the requested web content 505 at the client device 430, and insert the upload marker 600 in response. The upload marker 600 signals to the proxy server 432 that the upload request 431 contains an uploaded document. The proxy server 432 detects the upload marker 600 in the upload request 431, and, in response, instigates selective redaction on the uploaded document 402 based on the upload redaction policy 403, in the manner described above.

Note, the term server is used in a broad sense to include not only a single server device but also a set of multiple server devices used to implement an application or deliver a service to a client device. For example, an upload server may comprise multiple server devices (sharing a network address, or with different network addresses), and in some cases a first server device that receives a proxied content request may be different than a second server device that receives a proxied upload request. As another example, a proxy server may be implemented as a single proxy server device, or as multiple proxy server devices.

Figure 7:
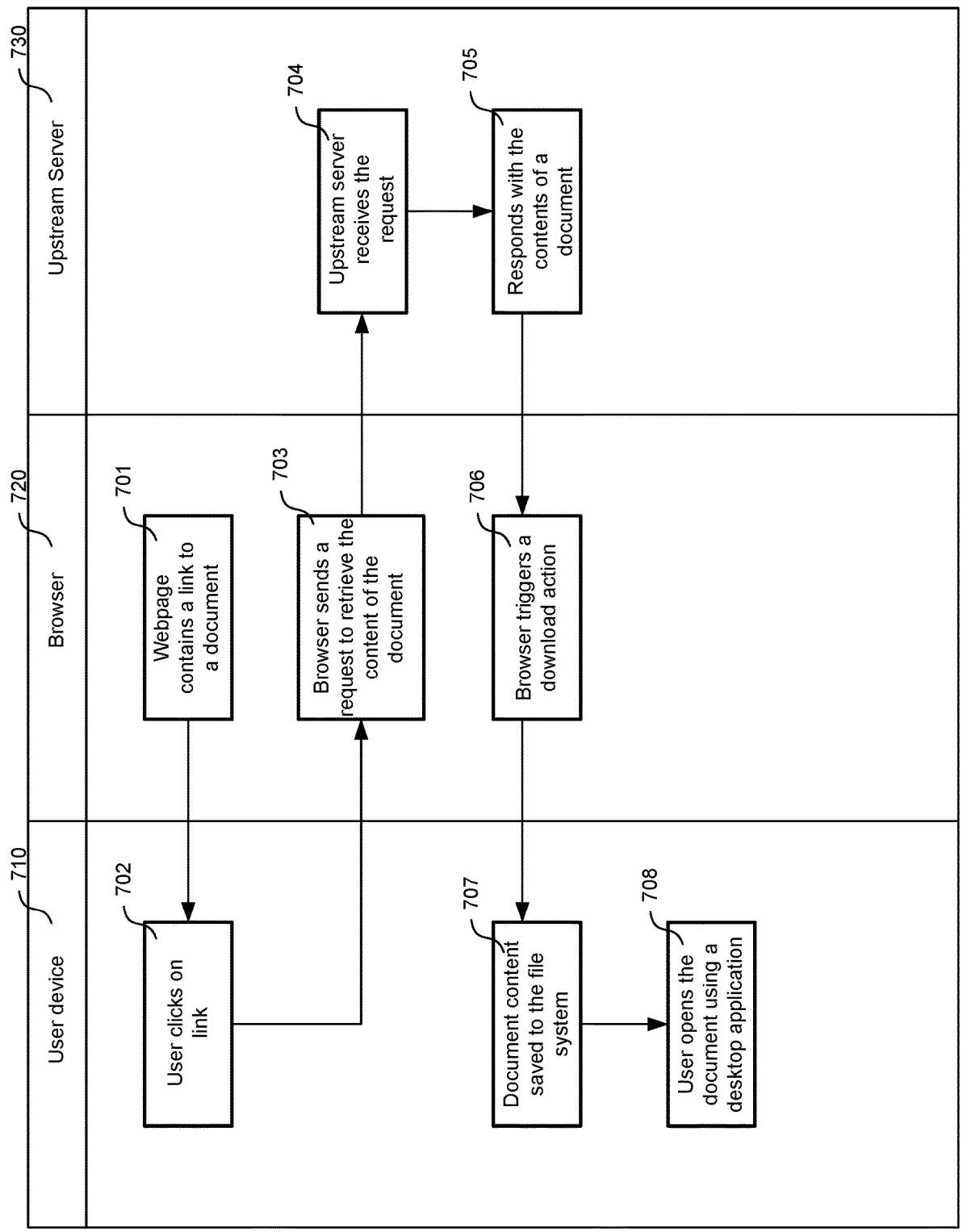
FIG. 7 shows a flowchart for a method of downloading a document from an upstream server to a client device.

FIG. 7 shows, by way of context, a flowchart for a method of downloading a document from an upstream server 730 to a user device 710 without the use of a proxy server. At step 701, a webpage is served to a browser 720. The webpage contains a link to a document (e.g. docx, pdf, pptx, etc . . . ). At step 702, a user input is received that selects the link to the document, causing the browser 720 to send, at step 703, a request to the upstream server 730 to retrieve the content of the document. The upstream server 730 receives the request at step 704 and responds at step 705 with the contents of a document. At step 706, the browser triggers a download action with the document's content and saves as a file to a local filesystem at step 707. At step 708, the user can then open the document using a desktop application separate from the browser.

Figure 8:
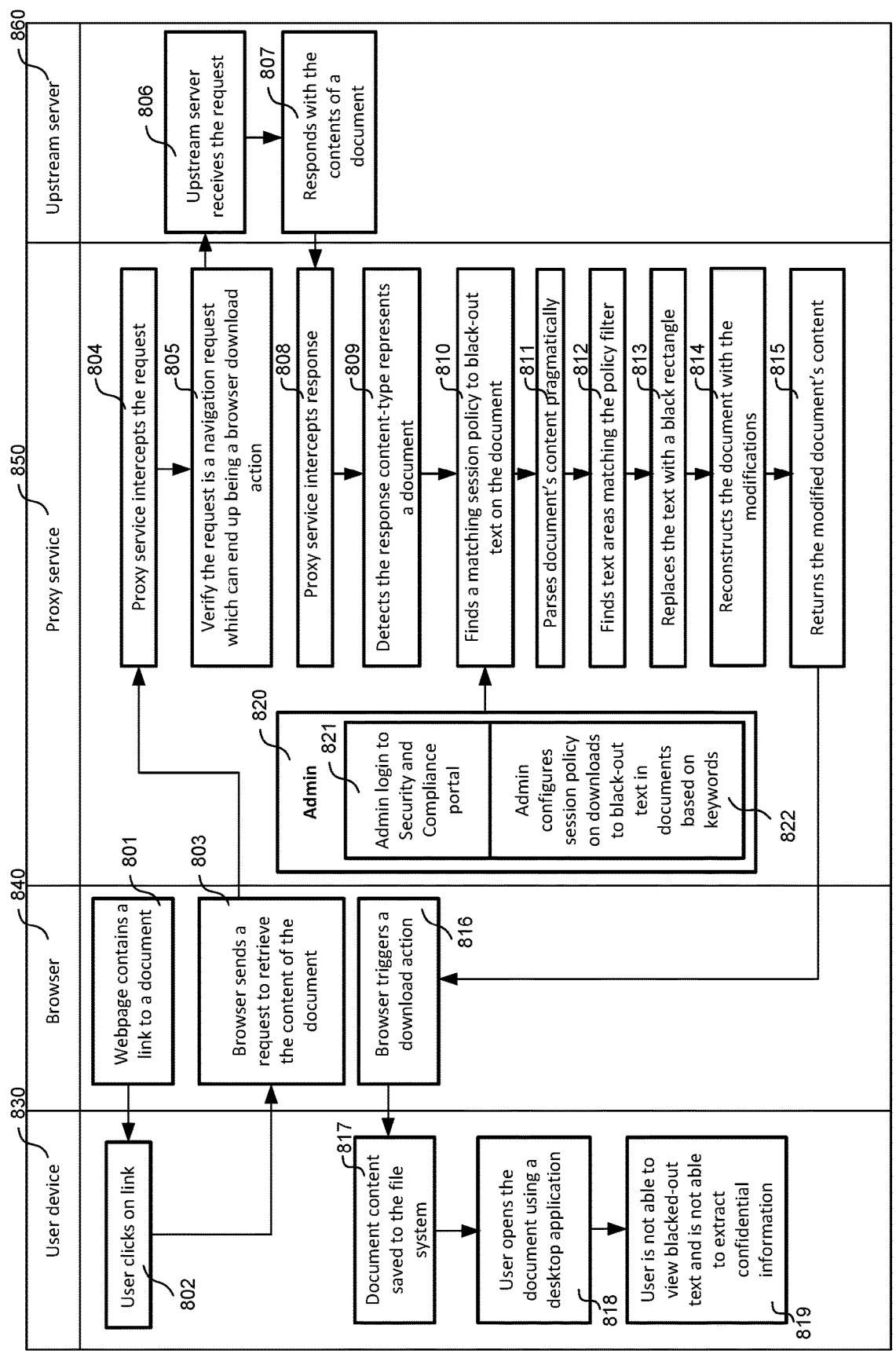
FIG. 8 shows a flowchart for a method of downloading a redacted version of a document from an upstream server to a client device via a proxy server.

FIG. 8 shows a flowchart for a method of downloading a document from an upstream server 860 to a user device 830 through the use of a proxy server 850 equipped with document redaction capabilities. For example, a redaction system may run on the proxy server 850, or on a separate server in communication with the proxy server 850.

At step 801, a webpage of a web browser 840 contains a link to a document (e.g. docx, pdf, pptx, etc . . . ). At step 802, a user selects the link of the document, causing the browser 840 to send a content request (e.g. HTTP request), at step 803, to retrieve the content of the document. The proxy-service 850 intercepts the request at step 804 and, at step 805, verifies the response is a navigation request which can end up being a browser download action. The upstream server 860 receives the request at step 806 and responds with the contents of a document at step 807. The proxy-service 850 intercepts the response and detects, at step 809, that the response content-type represents a document.

An administrator user 820 can log in, at step 821, to a security and compliance portal of the proxy server to configure, at step 822, a session-policy on downloads to redact text and/or other content in documents based on specific keywords.

At step 810, the proxy-service 850 finds a matching session-policy to redact text on the document from the session policy configured by the admin in step 820. The proxy server 850 then parses, at step 811, the document's content (e.g. using a pragmatic parsing method), finds text areas and/or other items matching the policy's filter at step 812, and redacts the text (e.g. replaces the text with a black rectangle at step 813. The document is reconstructed with the modifications at step 814 and the modified document's content is returned at step 815.

The browser 840 triggers a download action at step 816 with the document's content and saves the document content as a file to the filesystem at step 817. The user opens the document using a desktop application at step 818 (Microsoft's word, Adobe Acrobat, Microsoft's PowerPoint, etc. . . . ). The user cannot view the blacked-out text and is not able to extract any confidential content at step 819.

Figure 9:
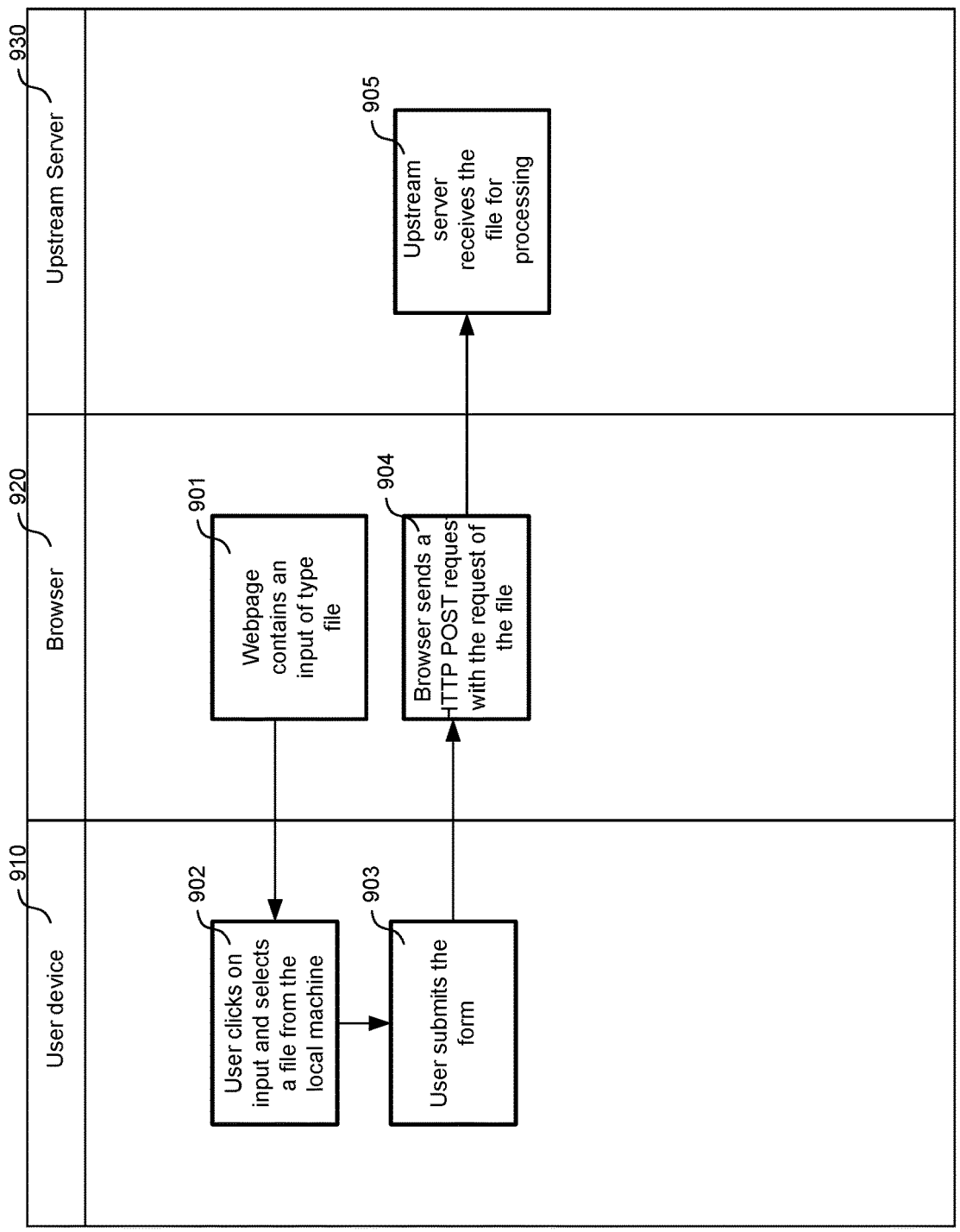
FIG. 9 shows a flowchart for a method of uploading a document to an upstream server from a client device.

FIG. 9 shows a flowchart for a method of uploading a document from a user device 910 to an upstream server 930 without the use of a proxy server. At step 901, the webpage of a browser 920 contains an input of type file. At step 902, a user clicks the input and selects a file from the local machine at step 910, and submits an upload form at step 903. The browser 920 sends a HTTP POST request at step 904 with the contents of the file. The upstream server 930 receives the file for processing at step 905.

Figure 10:
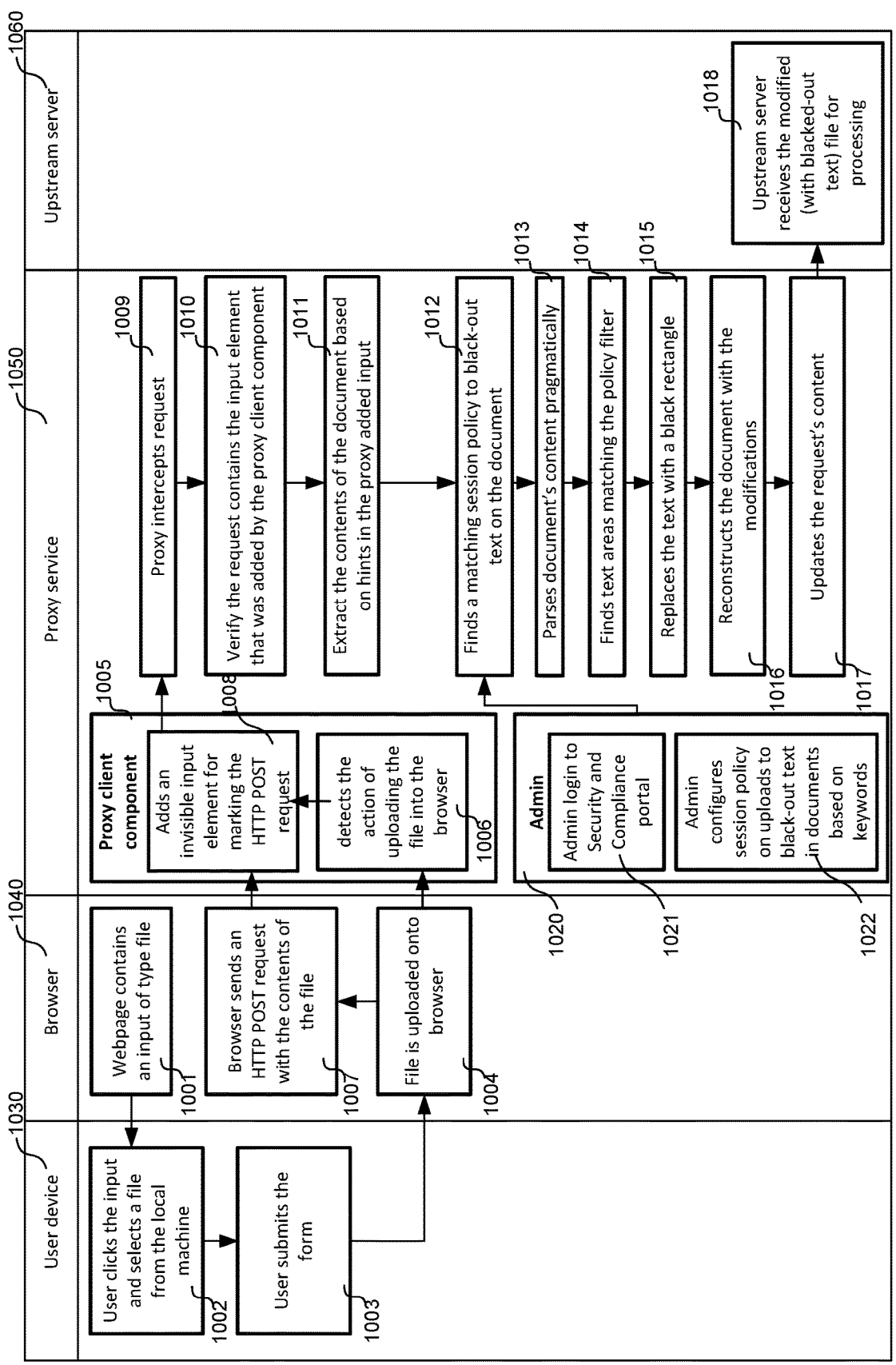
FIG. 10 shows a flowchart for a method of uploading a redacted version of a document to an upstream server from a client device via a proxy server.

FIG. 10 shows a flowchart for a method of uploading a document from a user device 1030 to an upstream server 1060 through the use of a proxy server 1050. At step 1001, a webpage of a browser 1040 contains an input of type file. At step 1002, a user clicks the input and selects a file from the local machine 1030 and submits an upload form at step 1003. At step 1004, the file is uploaded onto the browser 1040.

At step 1006, a proxy client component 1005 detects the action of uploading the file into the browser 1040. The browser 1040 sends a HTTP POST request 1007 with the contents of the file.

The proxy client component 1005 adds an invisible input element at step 1008 for marking the HTTP POST request, corresponding to the upload marker 600 of FIG. 6 in this example. For example, an input element of type "hidden" may be used. These types of elements allow web developers to include data that cannot be seen or modified by users when a form is submitted. For example, the ID of the content that is currently being ordered or edited, or a unique security token cannot be seen or modified. Hidden inputs may also be used to store and submit security tokens or secrets for security purposes.

The proxy-service 1050 intercepts the request at step 1009 from the browser 1040, and verifies, at step 1010, that the request contains the input argument that was added by the proxy client component 1005. The proxy-service 1050 extracts the contents of the document at step 1011 based on hints in the proxy added input.

At step 1021, an admin 1020 can login to a security and compliance portal of the proxy server 1050 to configure a session-policy at step 1022 on uploads to redact text in documents based on specific keywords.

Following the extraction of the contents of the document at step 1011, the proxy server 1050 finds, at step 1012, a matching session-policy to redact text on the document from the session policy configured by the admin 1020. The proxy server 1050 then parses the document's content (e.g., using a pragmatic parsing method) at step 1013, finds text areas matching the policy's filter 1014, and replaces the text with a black rectangle 1015. The document is reconstructed with the modifications 1016 and the request's content are updated at step 1017. An upstream server 1060 receives the modified (with blacked-out text) file at step 1018 for processing.

Figure 11:
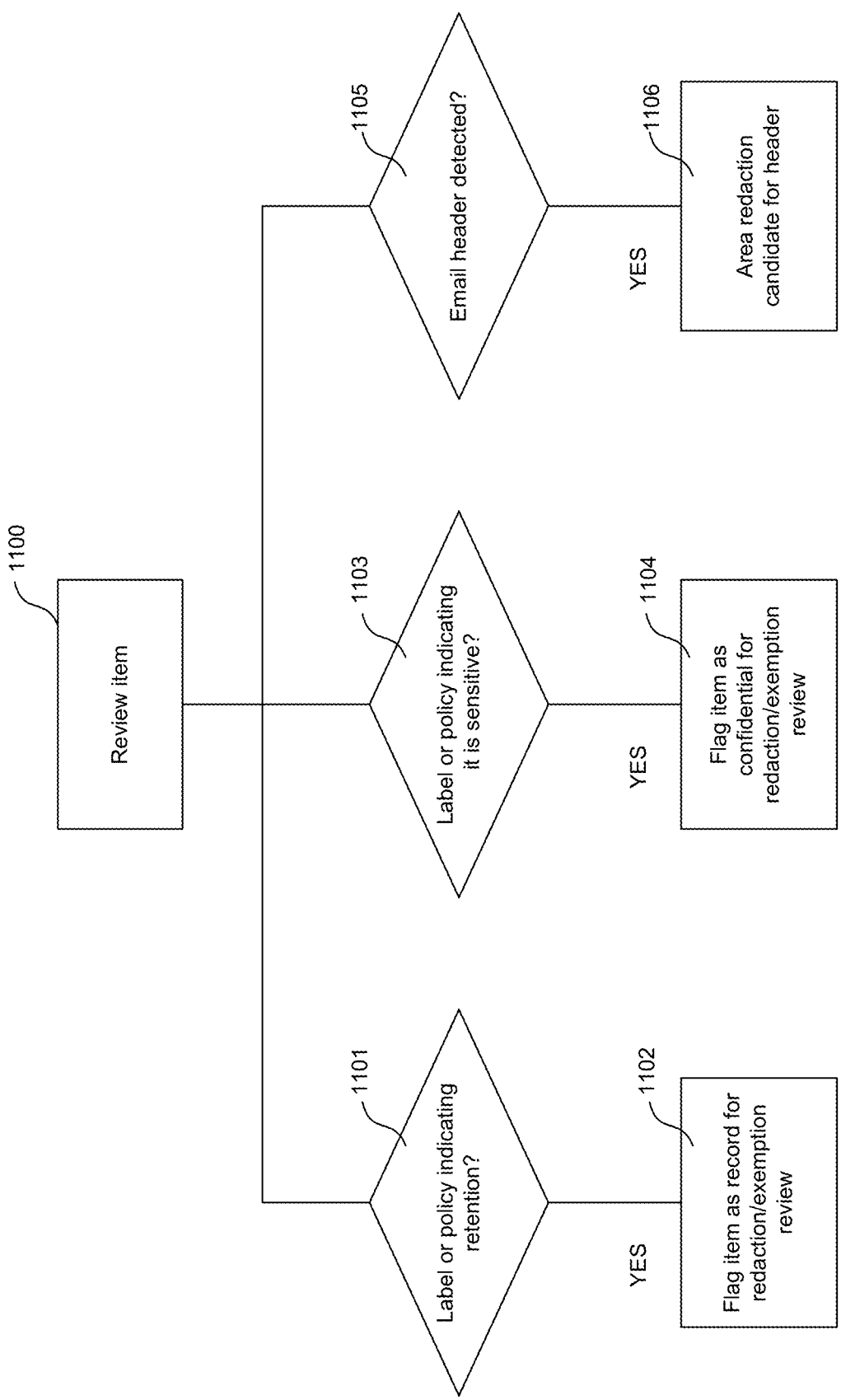
FIG. 11 shows a flowchart for a method for verifying redaction recommendations.

FIG. 11 shows a flowchart describing a process for checking for recommended redactions using labels, policies and area redaction for an item to be reviewed at step 1100. If the review item is found to contain a label or policy indicating retention at step 1101, the item is flagged as a record for redaction/exemption review at step 1102. If the review item is found to contain a label or policy indicating that the item is sensitive at step 1103, the item is flagged as confidential information at step 1104 for redaction/exemption review. If the item is found to contain an email header at step 1105, the header is used as an area redaction candidate at step 1106.

The method also allows to tailor redaction recommendations based on defined redaction context. Entity identifiers are used to denote items that should not be part of the redaction process. A document request may indicate entity identifier(s) to be excluded from the redaction process.

Figure 12:
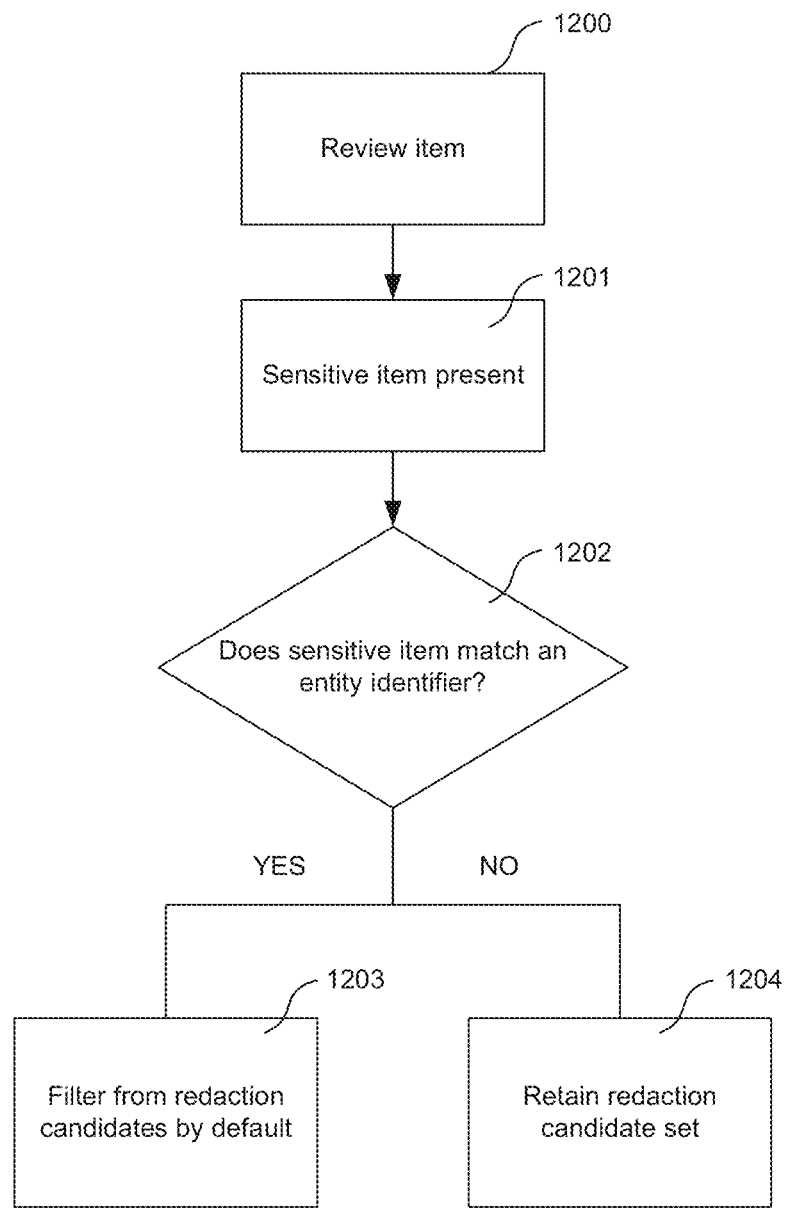
FIG. 12 shows a flow chart for a method of filtering redaction candidates based on redaction context.

FIG. 12 shows a flow chart for a selective redaction process. At step 1200, a document is searched for sensitive items, resulting in a redaction candidate set. When a sensitive item is detected (step 1201), a checked is performed to determine whether the sensitive item matches an entity identifier excluded from the redaction process. If a match is found at step 1202, then at step 1203, the sensitive item is filtered from the redaction candidate set by default. This default setting may be changed. e.g. by an administrator. If no match is found at step 1202, the sensitive item is redacted as a redaction candidate at step 1204 in the redaction candidate set. The identification and filtering of redaction candidates may be performed in separate stages (e.g. the document may be searched to build a complete redaction candidate set, which is then filtered), or they may be interleaves (e.g. whenever a redaction candidate is found, it may be checked against the entity identifier or identifiers applicable to the redaction process, and filtered out at that point if a match is found). Candidate redaction items (which have not been filtered out based on contextual input) may, for example, be indicated by way of a visual marker within the document itself (e.g. by automatically highlighting each candidate item within the document). Before final redaction, the visual marker(s) may be modified or removed based on user input, and/or additional marker(s) may be added, in order to add candidate redaction item(s) to the set of redaction candidates.

In some embodiments, the method allows custom term(s) or string(s) to be added to the search. In the case that a custom term is found, it is possible to obtain the number of instances of that custom term. The custom terms, denoting additional search items, are treated in a similar way to recommendations. The attributes of the custom terms allow them to be distinguished from recommendations. It is possible to save these custom term(s) or string(s) so that they may be viewed for any given item and modified at any time while the request is open for review. Similarly, it is possible to remove custom term(s) or string(s) added to the list, which will automatically undo any highlights or redaction actions performed already based on these custom terms or strings.

In some embodiments, the method allows both recommendations and custom items to be visually identified in an item review process. Visual highlights are created in the review experience for the recommended items, without making any material changes to the items. The method allows these visual highlights to be turned off, if desired, during the review process. It is possible to refresh the visual highlights by turning the visual highlights option off and then on again. This is useful when items are re-scanned on demand for redaction requests.

In some embodiments, the method provides a detailed view of the custom terms and recommendations for the items searched. A listing of all recommendations may be provided for a single item or for multiple items. These recommendations may be grouped or filtered based on various factors such as: classification type(s), confidence level of the system recommendation, value, prevalence within content, location. It is possible to see each individual recommendation may be displayed separately from the document, with surrounding document content (e.g. a predetermined number of characters before and after the detection). During the review process, it is possible to jump to any recommendation within the item without the need to review each recommendation in order.

In some embodiments, the method allows certain actions to be applied to the custom terms and recommendations such as applying a redaction, modifying a redaction annotation, or removing any applied redaction. It is possible to use the visual highlights described above to act on recommendations. It is possible to see the action taken instantly reflected within the review of the item(s). The actions specified may be taken on a single instance of a recommendation, or on multiple/all instances of a recommendation. It is possible to take action in bulk to redact, annotate a redaction or remove a redaction for all recommendations falling under a specific sensitive information type (e.g., all credit card numbers). The method allows actions to be taken in bulk to redact, annotate a redaction or remove a redaction for all recommendations based on various factors such as classification type, confidence level of the recommendation, and value of the recommendation. The privacy admin is able to bookkeep reasons of editing redactions.

In some embodiments, the method allows redactions to be made transparent within the review process on demand, without removal of the redaction. It is possible to make updates at any time for recommendation action(s) while the solution is in a state allowing for review and modification. e.g., it is possible to remove redactions, make redactions, change annotation on redactions. The method provides the capability to obtain how many redactions have been performed in one single item or in multiple or all items, and the capability to understand difference in redaction types (custom search and redaction, recommended redaction, manual area redaction). It is possible to find how many redactions were recommended to be taken, and how many redactions were taken. It is possible to obtain a redaction breakdown by multiple pivots such as by personal data type, value, location, prevalence, confidence.

In some embodiments, the method provides automated tailoring recommendations for the redaction process based on rules and/or policy and/or saved settings, of suppressing recommendations based on classification(s), values, custom term(s), recommendation confidence level(s), of adding recommendations when found based on manually added custom term(s) and of adding recommendations based on machine learning patterns of redaction behaviour. It is possible to configure default automation of recommended redaction based on various factors such as classification type(s), confidence level(s) and value(s). For instance, the automated redaction process may be programmed to "always redact", to "always redact+annotate" or to add a specific character count to redaction before and/or after the recommended value.

Figure 13:
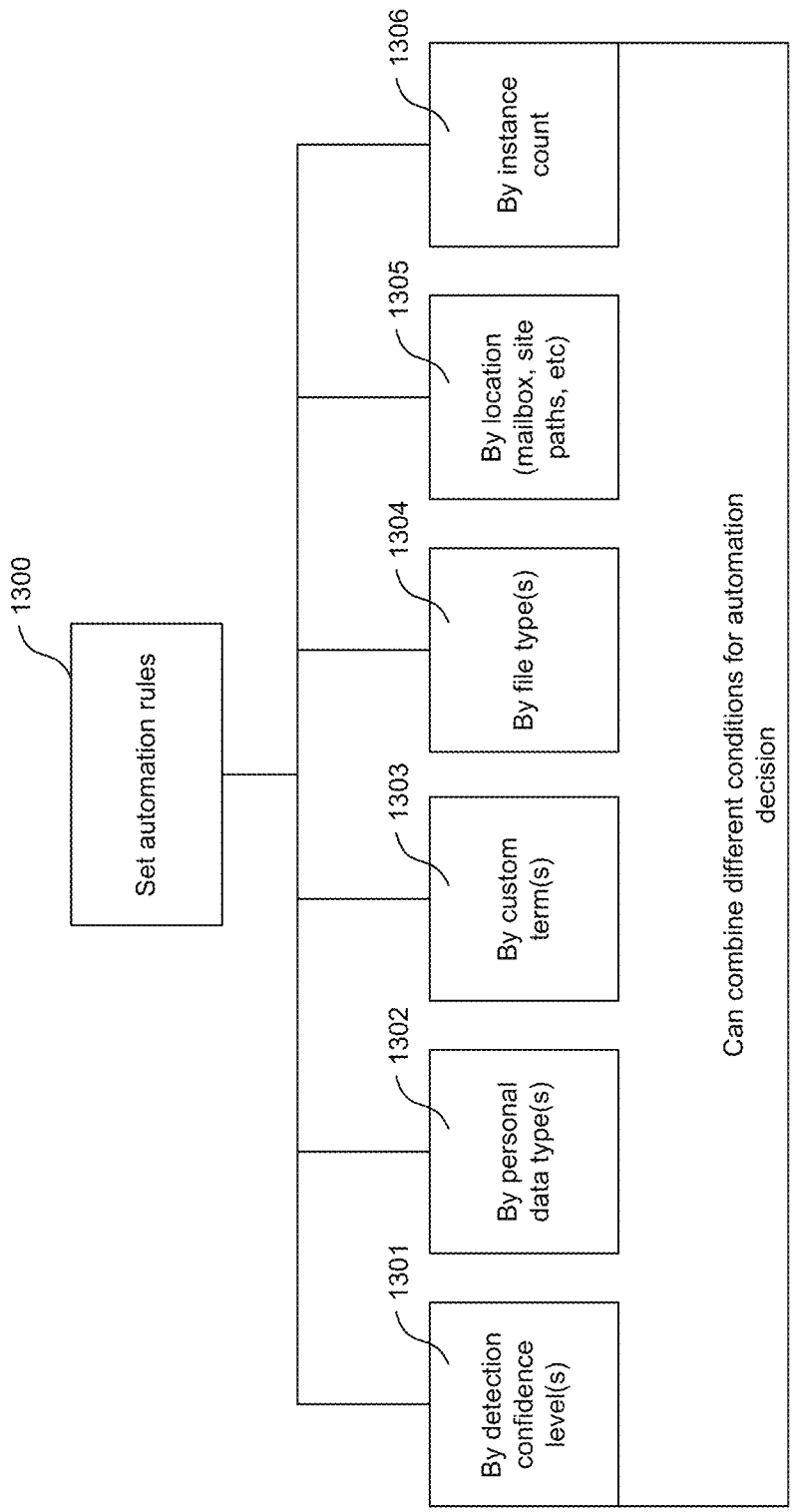
FIG. 13 illustrates various conditions that can be used for rule-based redaction automation.

FIG. 13 shows how rules may be used, at step 1300, to take automatic redaction actions based on confidence level(s) (step 1301), personal data type(s) (step 1302), common area or custom value such as email headers (e.g., From/To/CC/BCC), custom term(s) (step 1303) or string(s), file type(s) (step 1304), location (step 1305) (e.g., mailbox, site paths, etc.) and by instance count (step 1306).

Figure 14:
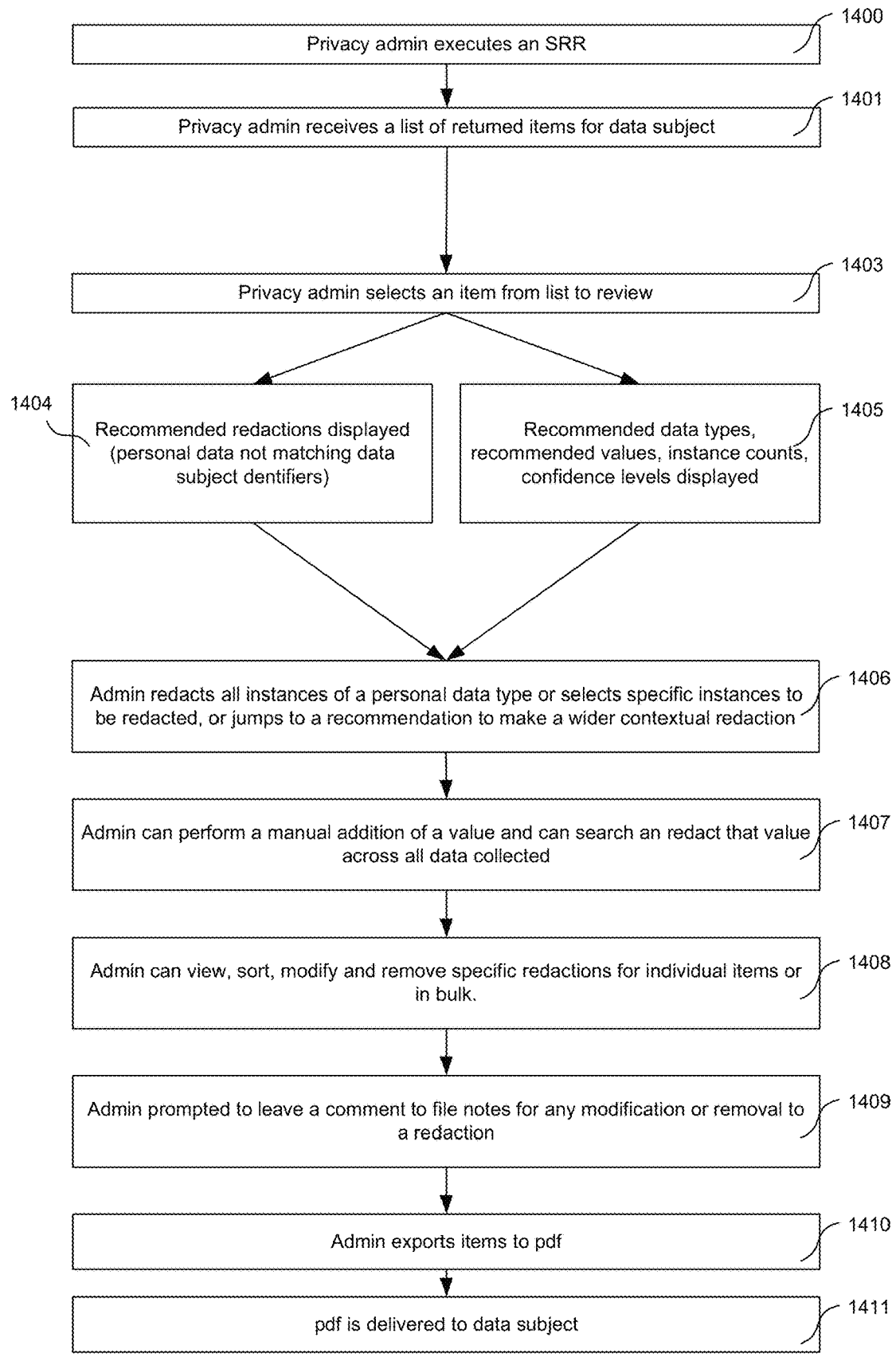
FIG. 14 shows a flowchart for an assisted redaction method.

FIG. 14 shows a flowchart for an example assisted redaction flow. At step 1400, a privacy admin executes a document retrieval request associated with an eID(s) and receives a list, at step 1401, of returned items in response. When the privacy admin selects an item at step 1403 from the list to review it, they can see recommended redactions at step 1404 where items such as personal data not matching the associated eID (or any associated eID) has been found and is recommended for redaction within their view. The privacy admin receives insights at step 1405 on what data types are recommended in the selected item, what values are recommended, instance counts for those values, as well as a confidence level for those recommendations. The privacy admin can select to redact all instances at step 1406 of a specific item type, e.g. specific personal data type (e.g. all social security numbers), all instances of a particular value (e.g. all occurrences of the value "John Doe"), all recommendations with a particular confidence threshold (e.g. all items that the system detected with a "High" confidence or a confidence above X %). The privacy admin can also see specific instances within context and select if they only want specific instances to be redacted. The privacy admin can navigate to any recommendation to see it within the preview pane for additional review or to make a wider redaction covering contextual information around it. The privacy admin can also perform a manual addition of a value at step 1407 to search for and redact that value across all data collected. Insights are then added related to this value.

The privacy admin can view insights on assisted redaction activities for a document access request. They can see how many recommendations were made for a request, along with the breakdown of the data types actually redacted and aggregate counts of each type. The privacy admin can see insights on confidence scores for redactions. This gives the privacy admin a good understanding of what work has already been done by the automated redaction, and where they may want to focus any additional review. The privacy admin can interact with any of these insights, which will bring a filtered list of relevant items to their view (e.g., the privacy admin can select the lowest confidence level insight to review those items in detail). At step 1408, the privacy admin can also view all redacted values, sorted to show the most frequently redacted values first. This allows the privacy admin to see briefly if there are any redactions that should not be in place. They can choose to remove redactions from any given value here, which will execute in bulk across the review set. They can also choose to select a value and view the files with those specific redactions for additional confirmation or modification. At any point when reviewing a file with redaction, the privacy admin can view what value is beneath the redaction and can also choose to remove the redaction on demand. They can also choose to remove redactions at a file level, for multiple file selections, or for all files that were collected. When performing an un-redaction activity, the privacy admin can be prompted to add a comment at step 1409 which will automatically be saved in the file's notes.

When the privacy admin performs an export at step 1410, the automated redaction system may, for example, export these items to a format file that ensures that the copy of the data provided to a requesting entity (e.g. user or device) cannot be unredacted, and has redactions visible as placed by the admins during review. Native, plain text unredacted copies of this information will not be included in the export package. At step 1411, the exported file is delivered to the data subject.

Figure 15:
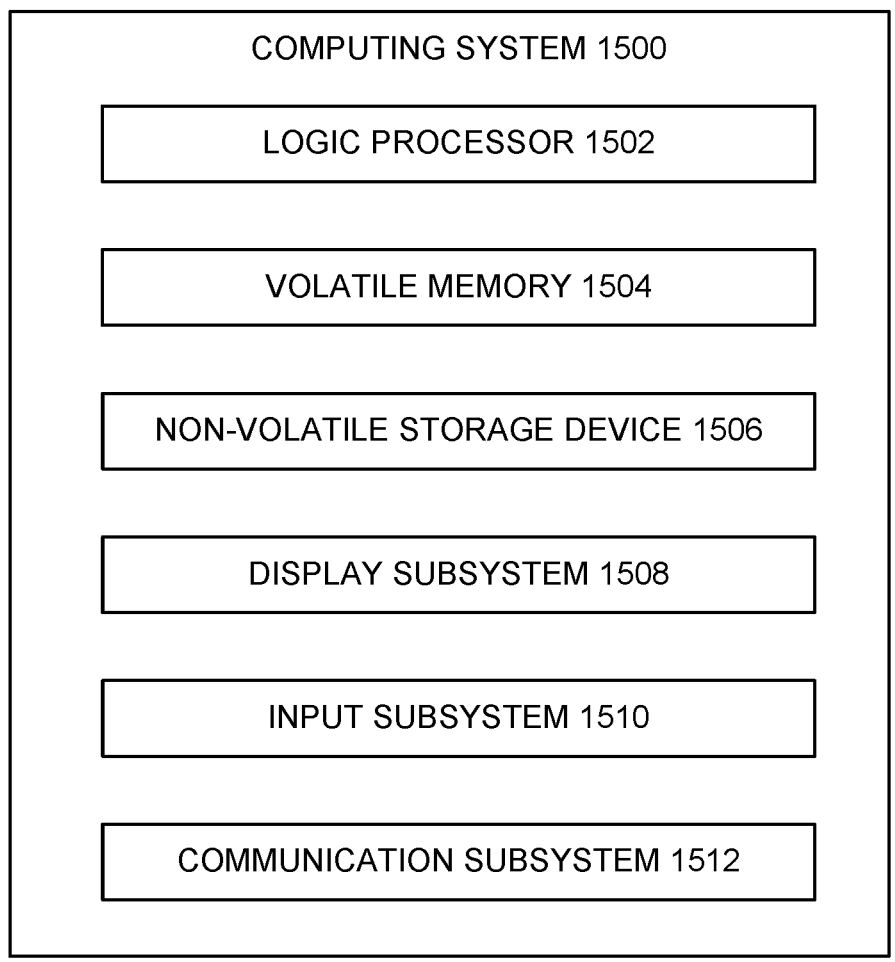
FIG. 15 shows a schematic block diagram of a computer system.

FIG. 15 schematically shows a non-limiting example of a computing system 1500, such as a computing device or system of connected computing devices, that can enact one or more of the methods or processes described above, including the filtering of data and implementation of the structured knowledge base described above. Computing system 1500 is shown in simplified form. Computing system 1500 includes a logic processor 1502, volatile memory 1504, and a non-volatile storage device 1506. Computing system 1500 may optionally include a display subsystem 1508, input subsystem 1510, communication subsystem 1512, and/or other components not shown in FIG. 15. Logic processor 1502 comprises one or more physical (hardware) processors configured to carry out processing operations. For example, the logic processor 1502 may be configured to execute instructions that are part of one or more applications, programs, routines, libraries, objects, components, data structures, or other logical constructs. The logic processor 1502 may include one or more hardware processors configured to execute software instructions based on an instruction set architecture, such as a central processing unit (CPU), graphical processing unit (GPU) or other form of accelerator processor. Additionally or alternatively, the logic processor 1502 may include a hardware processor(s) in the form of a logic circuit or firmware device configured to execute hardware-implemented logic (programmable or non-programmable) or firmware instructions. Processor(s) of the logic processor 1502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 1502 may be virtualized and executed by remotely accessible, networked computing devices configured in a cloud-computing configuration. In such a case, these virtualized aspects are run on different physical logic processors of various different machines. Non-volatile storage device 1506 includes one or more physical devices configured to hold instructions executable by the logic processor 1502 to implement the methods and processes described herein. When such methods and processes are implemented, the state of non-volatile storage device 1506 may be transformed—e.g., to hold different data. Non-volatile storage device 1506 may include physical devices that are removable and/or built-in. Non-volatile storage device 1506 may include optical memory (e g., CD, DVD, HD-DVD, Blu-Ray Disc, etc.), semiconductor memory (e g., ROM, EPROM, EEPROM, FLASH memory, etc.), and/or magnetic memory (e.g., hard-disk drive), or other mass storage device technology. Non-volatile storage device 1506 may include nonvolatile, dynamic, static, read/write, read-only, sequential-access, location-addressable, file-addressable, and/or content-addressable devices. Volatile memory 1504 may include one or more physical devices that include random access memory. Volatile memory 1504 is typically utilized by logic processor 1502 to temporarily store information during processing of software instructions. Aspects of logic processor 1502, volatile memory 1504, and non-volatile storage device 1506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "module," "program," and "engine" may be used to describe an aspect of computing system 1500 typically implemented in software by a processor to perform a particular function using portions of volatile memory, which function involves transformative processing that specially configures the processor to perform the function. Thus, a module, program, or engine may be instantiated via logic processor 1502 executing instructions held by non-volatile storage device 1506, using portions of volatile memory 1504. Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. When included, display subsystem 1508 may be used to present a visual representation of data held by non-volatile storage device 1506. The visual representation may take the form of a graphical user interface (GUI). As the herein-described methods and processes change the data held by the non-volatile storage device, and thus transform the state of the non-volatile storage device, the state of display subsystem 1508 may likewise be transformed to visually represent changes in the underlying data. Display subsystem 1508 may include one or more display devices utilizing virtually any type of technology. Such display devices may be combined with logic processor 1502, volatile memory 1504, and/or non-volatile storage device 1506 in a shared enclosure, or such display devices may be peripheral display devices. When included, input subsystem 1510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor. When included, communication subsystem 1512 may be configured to communicatively couple various computing devices described herein with each other, and with other devices. Communication subsystem 1512 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1500 to send and/or receive messages to and/or from other devices via a network such as the internet. The term computer readable media as used herein may include computer storage media. Computer storage media may include volatile and non-volatile, removable and nonremovable media (e.g., volatile memory 1504 or non-volatile storage 1506) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 1500 or a component device thereof). Computer storage media does not include a carrier wave or other propagated or modulated data signal. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

In a first aspect disclosed herein, a computer-implemented method comprises: obtaining an electronic document and an entity identifier associated with the electronic document, the entity identifier relating to a predefined sensitive information category; detecting within the electronic document a first item belonging to the predefined sensitive information category; detecting within the electronic document a second item belonging to the predefined sensitive information category; matching the first item with the entity identifier; based on matching the first item with the entity identifier and detecting the second item, redacting the second item from the electronic document, resulting in a redacted document comprising the first item; and outputting the redacted document comprising the first item.

In embodiments, the method may comprise receiving a document search request comprising the entity identifier, wherein the electronic document may be obtained from computer-readable storage via a document search based on the entity identifier.

The method of claim 1 may comprise receiving at a proxy server from a client device a download request associated with the entity identifier; in response to the download request: transmitting a proxied download request from the proxy server to an upstream server, receiving from the upstream server at the proxy server the electronic document in response to the proxied download request, detecting the first item and the second item within the electronic document received from the upstream server, matching the first item with the entity identifier, redacting the second item, and transmitting the redacted document from the proxy server to the client device.

The entity identifier may comprise a user identifier associated with the client device.

The proxy server may be a web proxy server and the download request may be received from a web browser executed on the client device.

The method may comprise receiving at a proxy server from a client device a message comprising the electronic document, the message associated with the entity identifier; in response to the message comprising the electronic document: detecting the first item and the second item within the electronic document received from the client device, matching the first item with the entity identifier, redacting the second item, and transmitting from the proxy server to an upstream server a proxied message comprising the redacted document.

The entity identifier may comprise a user identifier associated with the client device.

The proxy server may be a web proxy server and the message may be received from a web browser executed on the client device.

The method may comprise receiving at the proxy server from the client device a content request comprising a resource identifier; in response to the content request: retrieving at the proxy server web content associated with the resource identifier, generating, based on the web content, modified web content comprising proxy client code, causing the proxy client code to be executed on the client device, and transmitting the modified web content to the client device; detecting, in the message comprising the electronic document, marker data inserted by the client proxy code executed on the client device; responsive to detecting the marker data: detecting the first item and the second item within the electronic document received from the client device, matching the first item with the entity identifier, redacting the second item, and transmitting from the proxy server to an upstream server the proxied message comprising the redacted document.

The method may comprise outputting, via a graphical user interface, an indication of the second item, wherein the second item may be redacted from the electronic document responsive to a user input indicating the second item.

The method may comprise displaying the electronic document via the graphical user interface, wherein the indication of the second item may comprise a visual marker marking the second item within the electronic document.

The method may comprise outputting, in association with the indication of the second item, an indication of the predefined sensitive information category.

The entity identifier may be a person identifier or a person group identifier, and the predefined sensitive information category may be a predefined personal information category.

A second aspect herein provides proxy server comprising: at least one memory configured to store computer-readable instructions; at least one processor coupled to the at least one memory and configured to execute the computer-readable instructions, the computer-readable instructions configured, upon execution on the at least one processor, to cause the at least one processor to: generate, based on a content request received from a client device, a proxied content request; transmit, to an upstream server, the proxied content request; receive, in response to the proxied content request, a first response comprising requested web content; transmit, to the client device, a second response comprising the requested web content and executable proxy client code; receive, from the client device, an upload request comprising: a document, and an upload marker generated by the executable proxy client code when executed on the client device; identify the upload marker in the upload request; responsive to identifying the upload marker in the upload request, cause redaction from the document of an item determined to belong to a predefined sensitive information category, resulting in a redacted document; generate a proxied upload request comprising the redacted document; and transmit the proxied upload request to the upstream server.

A third aspect herein provides a proxy server comprising: at least one memory configured to store computer-readable instructions; at least one processor coupled to the at least one memory and configured to execute the computer-readable instructions, the computer-readable instructions configured, upon execution on the at least one processor, to cause the at least one processor to: receive at the proxy server from a client device a content request comprising a resource identifier; in response to the content request: retrieve web content associated with the resource identifier, generating, based on the web content, modified web content comprising proxy client code, and transmitting the modified web content to the client device, causing execution of the proxy client code on the client device; receive, at the proxy server from the client device, an upload request comprising a document; detect in the upload request marker data inserted by the client proxy code executed on the client device; responsive to detecting the marker data in the upload request, cause redaction from the document of an item determined to belong to a predefined sensitive information category, resulting in a redacted document; generate a proxied upload request comprising the redacted document; and transmit the proxied upload request to an upstream server.

In embodiments, the computer-readable instructions may be configured to cause the at least one processor to: determine an entity identifier based on the upload request; and cause redaction of the item from the document based on the entity identifier.

The item may, for example, be redacted from the document responsive to determining that the item does not match the entity identifier.

A third aspect herein provides a computer-readable storage medium configured to store computer-readable instructions, the computer-readable instructions configured, upon execution on at least one processor, to cause the at least one processor to implement operations comprising: receiving a message from a client device; determining an entity identifier associated with the message; obtaining a document associated with the message; and causing redaction from the document of an item that is i) determined to belong to a predefined sensitive information category, and ii) determined not to match the entity identifier, resulting in a redacted document.

In embodiments, the message may be a download request, and obtaining the document may comprise: transmitting a proxied download request to an upstream server, and receiving the document from the upstream server in response, in which case the operations may further comprise transmitting to the client device a response comprising the redacted document.

Alternatively, the message may comprise the document, in which case the operations may further comprise transmitting to an upstream server a proxied message comprising the redacted document.

Alternatively, the document may be obtained from document storage via a document search performed using the entity identifier.

The entity identifier may be a user identifier associated with the message or with the client device, and the predefined sensitive information category may be a predefined personal information category.

Further aspects provide a computer system comprising at least one processor configured to implement any of the above methods or function, and computer-readable instructions for programming a computer system to implement the same.

It will be appreciated that the above embodiments have been disclosed by way of example only. Other variants or use cases may become apparent to a person skilled in the art once given the disclosure herein. The scope of the present disclosure is not limited by the above-described embodiments, but only by the accompanying claims.

The invention claimed is:

1. A computer-implemented method comprising:
   obtaining an electronic document and an entity identifier associated with the electronic document;
   identifying, in the electronic document, a group of redaction candidates, each redaction candidate of the group of redaction candidates comprising a document portion associated with one of a plurality of sensitive information categories, a first redaction candidate of the group of redaction candidates being associated with a particular sensitive information category of the plurality of sensitive information categories and matches the entity identifier itself and a second redaction candidate of the group of redaction candidates being associated with the particular sensitive information category and does not match the entity identifier itself;
   filtering, from the group of redaction candidates, ones of the redaction candidates that match the entity identifier itself, resulting in a group of filtered redaction candidates that excludes at least the first redaction candidate based on the first redaction candidate matching the entity identifier itself;
   removing only the group of filtered redaction candidates from the electronic document, resulting in a redacted document comprising the first redaction candidate and not the second redaction candidate; and
   outputting the redacted document comprising the first redaction candidate;
   wherein:
   the method is performed by a proxy server; the obtaining of the electronic document comprises:
   receiving, from a client device, a download request associated with the entity identifier;
   in response to the receiving of the download request, transmitting a proxied download request from the proxy server to an upstream server; and
   receiving from the upstream server at the proxy server the electronic document in response to the proxied download request; and
   the method further comprises transmitting the redacted document from the proxy server to the client device.

2. The method of claim 1, further comprising receiving a document search request comprising the entity identifier, wherein the electronic document is obtained from computer-readable storage via a document search based on the entity identifier.

3. The method of claim 1, wherein the entity identifier comprises a user identifier associated with the client device.

4. The method of claim 1, wherein the method is performed by a web proxy server and the download request is received from a web browser executed on the client device.

5. The method of claim 1, wherein:
   the obtaining of the electronic document comprises receiving, from a client device, a message comprising the electronic document, the message being associated with the entity identifier; and
   the method further comprises transmitting to an upstream server a proxied message comprising the redacted document.

6. The method of claim 5, wherein the entity identifier comprises a user identifier associated with the client device.

7. The method of claim 5, wherein the wherein the method is performed by a web proxy server and the message is received from a web browser executed on the client device.

8. The method of claim 7, wherein:
   the obtaining of the electronic document further comprises:
   receiving, at the web proxy server and from the client device, a content request comprising a resource identifier;
   in response to the content request, retrieving, at the web proxy server, web content associated with the resource identifier;
   generating, based on the web content, modified web content comprising proxy client code, wherein the proxy client code is added to the web content to generate the modified web content; and
   transmitting the modified web content to the client device, whereby the proxy client code is executed on the client device; and
   the method further comprises:
   detecting, in the message comprising the electronic document, marker data inserted by the client proxy code executed on the client device, wherein the identifying of the group of redaction candidates, the filtering of the group of redaction candidates, and the removing of the group of filtered redaction candidates from the electronic document are performed in response to the detecting of the marker data.

9. The method of claim 1, further comprising:
outputting, via a graphical user interface, an indication of the group of filtered redaction candidates including the second redaction candidate; and
receiving input via the graphical user interface to modify the group of filtered redaction candidates.

10. The method of claim 9, wherein the outputting of the indication of the group of filtered redaction candidates comprises displaying the electronic document via the graphical user interface, wherein the indication of the group of filtered redaction candidates comprises a visual marker marking the group of filtered candidates within the electronic document.

11. The method of claim 9, comprising outputting, in association with the indication of the second redaction candidate, an indication of the particular sensitive information category.

12. The method of claim 1, wherein the entity identifier is a person identifier or a person group identifier, wherein the particular sensitive information category is a predefined personal information category.

13. A proxy server comprising:
at least one memory configured to store computer-readable instructions;
at least one processor coupled to the at least one memory and configured to execute the computer-readable instructions, the computer-readable instructions configured, upon execution on the at least one processor, to cause the at least one processor to:
receive, at the proxy server and from a client device, a content request comprising a resource identifier;
in response to the content request, retrieve web content associated with the resource identifier;
generating, based on the web content, modified web content comprising proxy client code, wherein the proxy client code is added to the web content to generate the modified web content; and
transmitting the modified web content to the client device, whereby the proxy client code is executed on the client device;
receive, at the proxy server and from the client device, an upload request comprising a document;
detect, in the upload request, marker data inserted by the client proxy code executed on the client device;
responsive to the detecting of the marker data in the upload request, cause redaction from the document, resulting in a redacted document;
generate a proxied upload request comprising the redacted document; and
transmit the proxied upload request to an upstream server.

14. The proxy server of claim 13, wherein the computer-readable instructions are further configured to cause the at least one processor to determine an entity identifier based on the upload request, wherein the redaction of the document is based on the entity identifier.

15. The proxy server of claim 14, wherein the redaction comprises removing sensitive information from the document that does not match the entity identifier.

16. A non-transitory computer-readable storage medium configured to store computer-readable instructions, the computer-readable instructions configured, upon execution on at least one processor, to cause the at least one processor to implement operations comprising:
receiving a message from a client device;
determining an entity identifier associated with the message;
obtaining an electronic document associated with the message; and
identifying, in the electronic document, a group of redaction candidates, each redaction candidate of the group of redaction candidates comprising a document portion associated with one of a plurality of sensitive information categories, a first redaction candidate of the group of redaction candidates being associated with a particular sensitive information category of the plurality of sensitive information categories and matches the entity identifier itself and a second redaction candidate of the group of redaction candidates being associated with the particular sensitive information category and does not match the entity identifier itself;
filtering, from the group of redaction candidates, ones of the redaction candidates that match the entity identifier itself, resulting in a group of filtered redaction candidates that excludes at least the first redaction candidate based on the first redaction candidate matching the entity identifier itself; and
removing only the group of filtered redaction candidates from the electronic document, resulting in a redacted document comprising the first redaction candidate and not the second redaction candidate; wherein:
the method is performed by a proxy server; the obtaining of the electronic document comprises:
receiving, from a client device, a download request associated with the entity identifier;
in response to the receiving of the download request, transmitting a proxied download request from the proxy server to an upstream server; and
receiving from the upstream server at the proxy server the electronic document in response to the proxied download request; and
the method further comprises transmitting the redacted document from the proxy server to the client device.

17. The computer-readable storage medium of claim 16, wherein:
the message is a download request, and the obtaining of the electronic document comprises transmitting a proxied download request corresponding to the message to an upstream server, and receiving the electronic document from the upstream server in response to the proxied download request, said operations further comprising transmitting to the client device a response comprising the redacted document; or
the message comprises the document, said operations further comprising transmitting to an upstream server a proxied message comprising the redacted document.

18. The computer-readable storage medium of claim 16, wherein the message comprises a search request indicating the entity identifier and the electronic document is obtained from document storage via a document search performed based on the search request.

19. The computer-readable storage medium of claim 16, wherein the entity identifier is a user identifier associated with the message or with the client device, wherein the particular sensitive information category is a predefined personal information category.

* * * * *